(12) United States Patent
Watanabe et al.

(10) Patent No.: US 11,960,175 B2
(45) Date of Patent: Apr. 16, 2024

(54) LIQUID CRYSTAL DISPLAY DEVICE

(71) Applicant: Japan Display Inc., Tokyo (JP)

(72) Inventors: Kyosuke Watanabe, Tokyo (JP); Yuji Maede, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/329,870

(22) Filed: Jun. 6, 2023

(65) Prior Publication Data
US 2023/0314879 A1 Oct. 5, 2023

Related U.S. Application Data

(63) Continuation of application No. 17/651,090, filed on Feb. 15, 2022, now Pat. No. 11,709,398, which is a continuation of application No. PCT/JP2020/022447, filed on Jun. 5, 2020.

(30) Foreign Application Priority Data

Aug. 22, 2019 (JP) ................. 2019-152171

(51) Int. Cl.
  *G02F 1/1343* (2006.01)
  *G02F 1/1362* (2006.01)
(52) U.S. Cl.
  CPC .... *G02F 1/134318* (2021.01); *G02F 1/13439* (2013.01); *G02F 1/136286* (2013.01)
(58) Field of Classification Search
  CPC .................................................. G02F 1/1343
  See application file for complete search history.

(56) References Cited

U.S. PATENT DOCUMENTS

| 5,708,486 A | * | 1/1998 | Miyawaki | G02F 1/133553 349/44 |
| 2004/0189922 A1 | * | 9/2004 | Ono | G02F 1/134363 349/141 |
| 2009/0160748 A1 | * | 6/2009 | Kimura | G02F 1/134363 345/94 |
| 2011/0216280 A1 | | 9/2011 | Itou | |
| 2012/0074415 A1 | | 3/2012 | Sato et al. | |
| 2013/0234143 A1 | * | 9/2013 | Hwang | H01L 27/124 438/34 |

(Continued)

FOREIGN PATENT DOCUMENTS

| CN | 108051960 A | 5/2018 |
| CN | 111477641 A | 7/2020 |

(Continued)

*Primary Examiner* — Sang V Nguyen
(74) *Attorney, Agent, or Firm* — Maier & Maier, PLLC

(57) ABSTRACT

According to one embodiment, a liquid crystal display device includes first and second substrates and a liquid crystal layer. The first substrate includes scanning line extending in a first direction, signal line extending in a second direction, pixel electrodes including and a common electrode. The common electrode includes sub-electrodes extending in the first or second direction. Each of the sub-electrodes includes a first portion having a width greater than the scanning or signal line, and a second portion having a width less than the first portion but greater than the scanning or signal line. The first and second portions are alternately arranged along a direction in which the sub-electrodes extend.

9 Claims, 21 Drawing Sheets

(56) References Cited

U.S. PATENT DOCUMENTS

2015/0009439 A1* 1/2015 Morita .............. G02F 1/134363
            349/42
2015/0124208 A1 5/2015 Sugiyama et al.
2016/0004130 A1 1/2016 Hirota et al.

FOREIGN PATENT DOCUMENTS

| JP | 2011186010 A | 9/2011 |
| JP | 2012068432 A | 4/2012 |
| JP | 2015090435 A | 5/2015 |
| JP | 2016014779 A | 1/2016 |

* cited by examiner

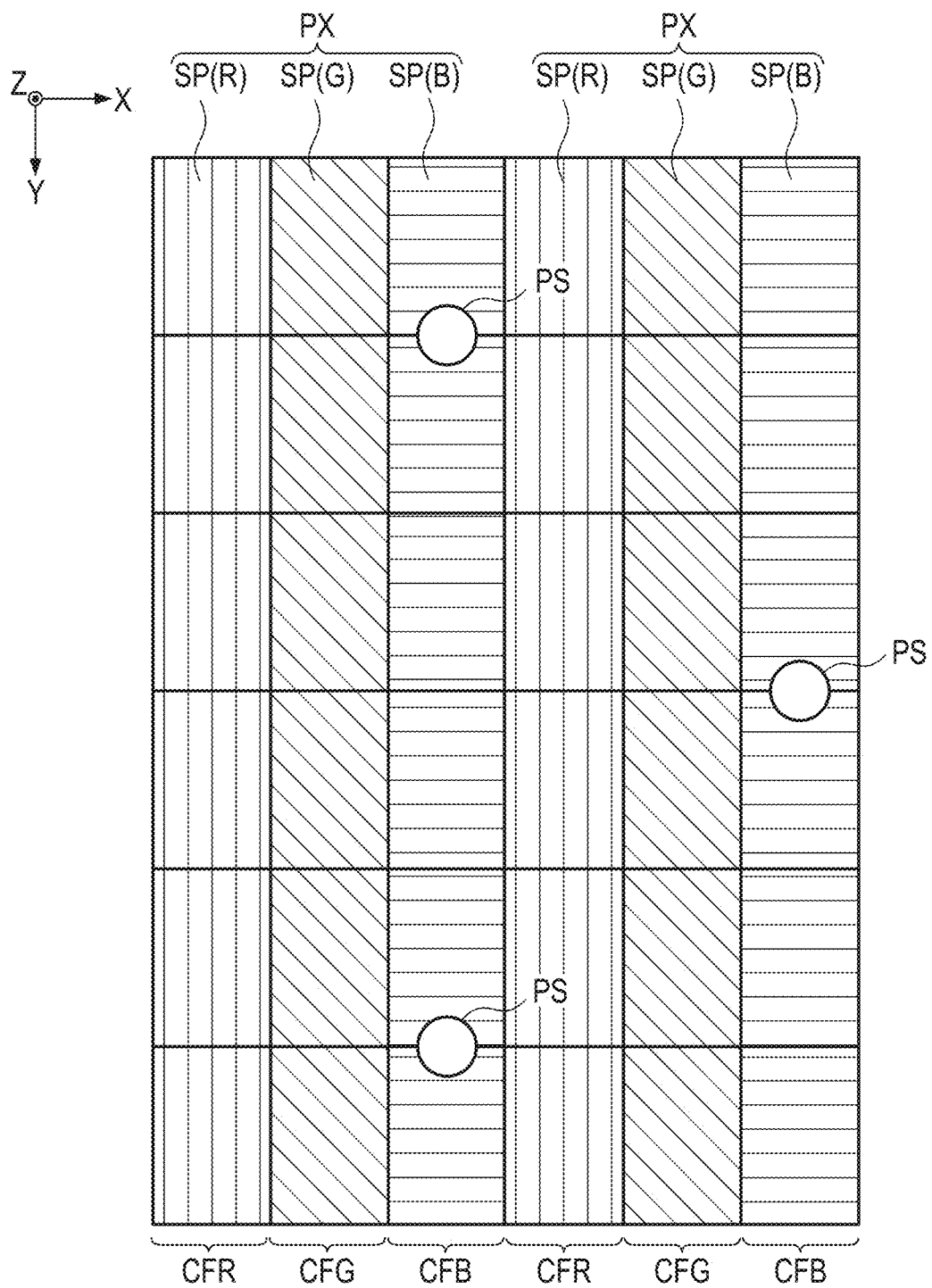
F I G. 3

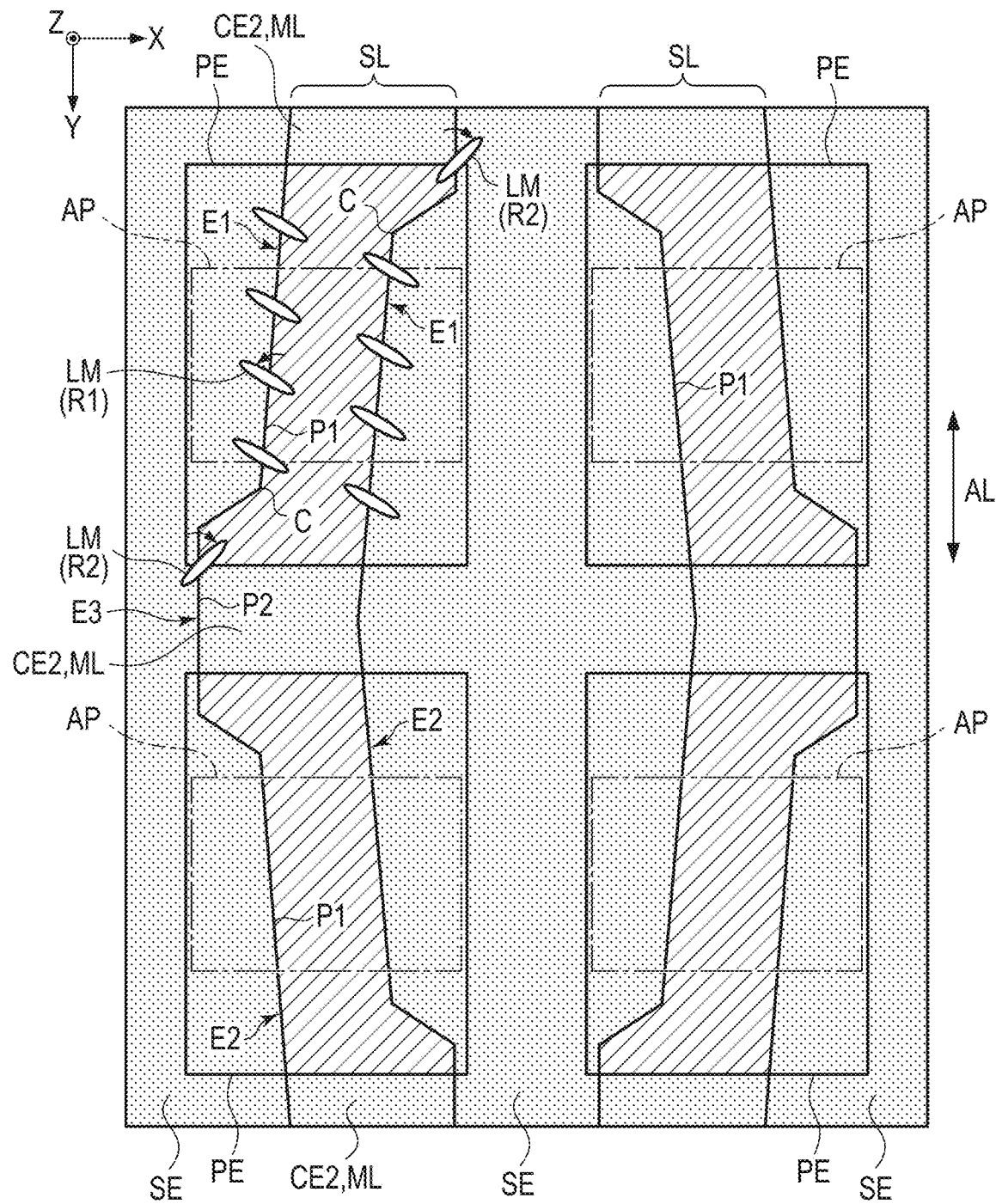
F I G. 6

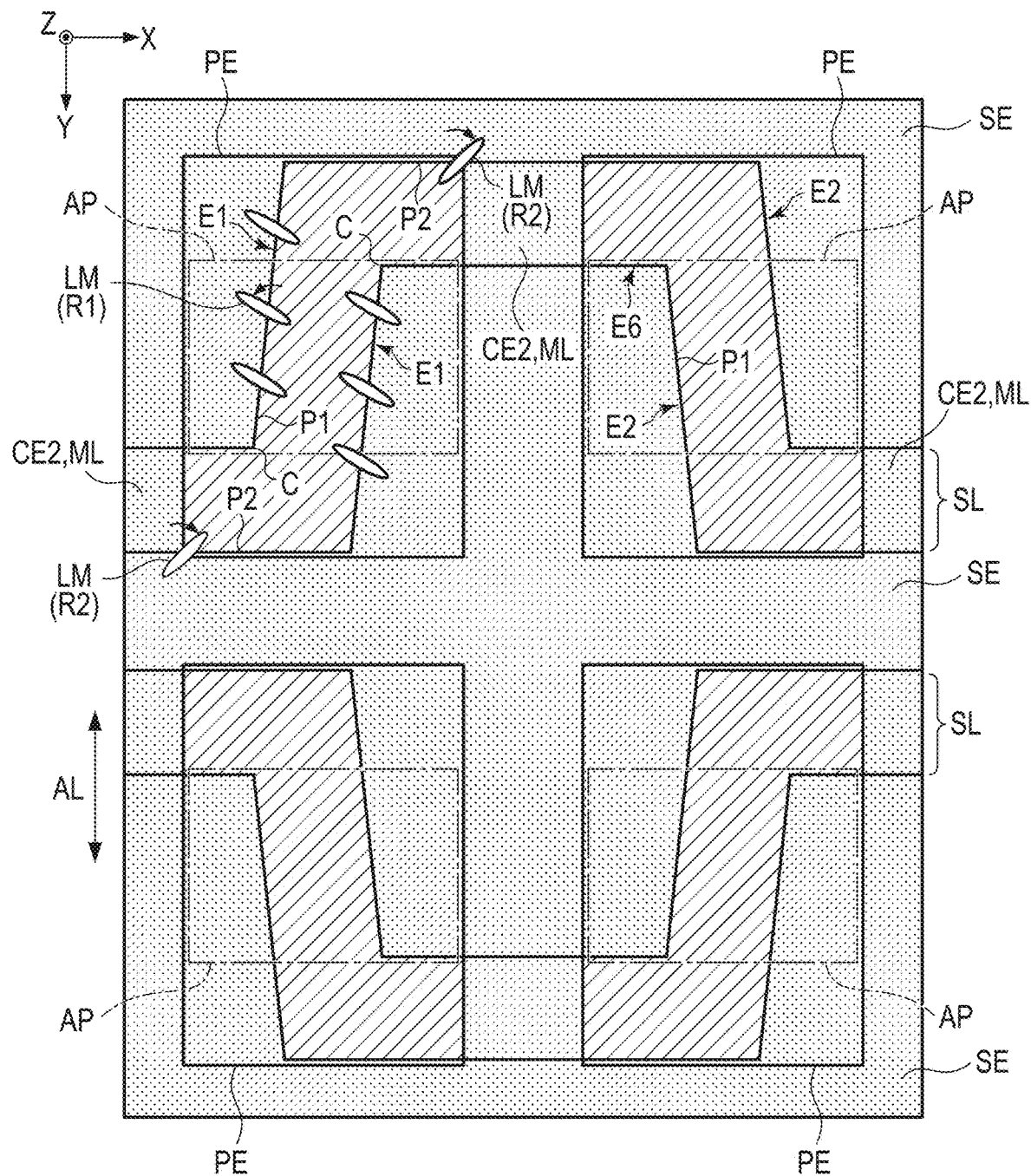
F I G. 14

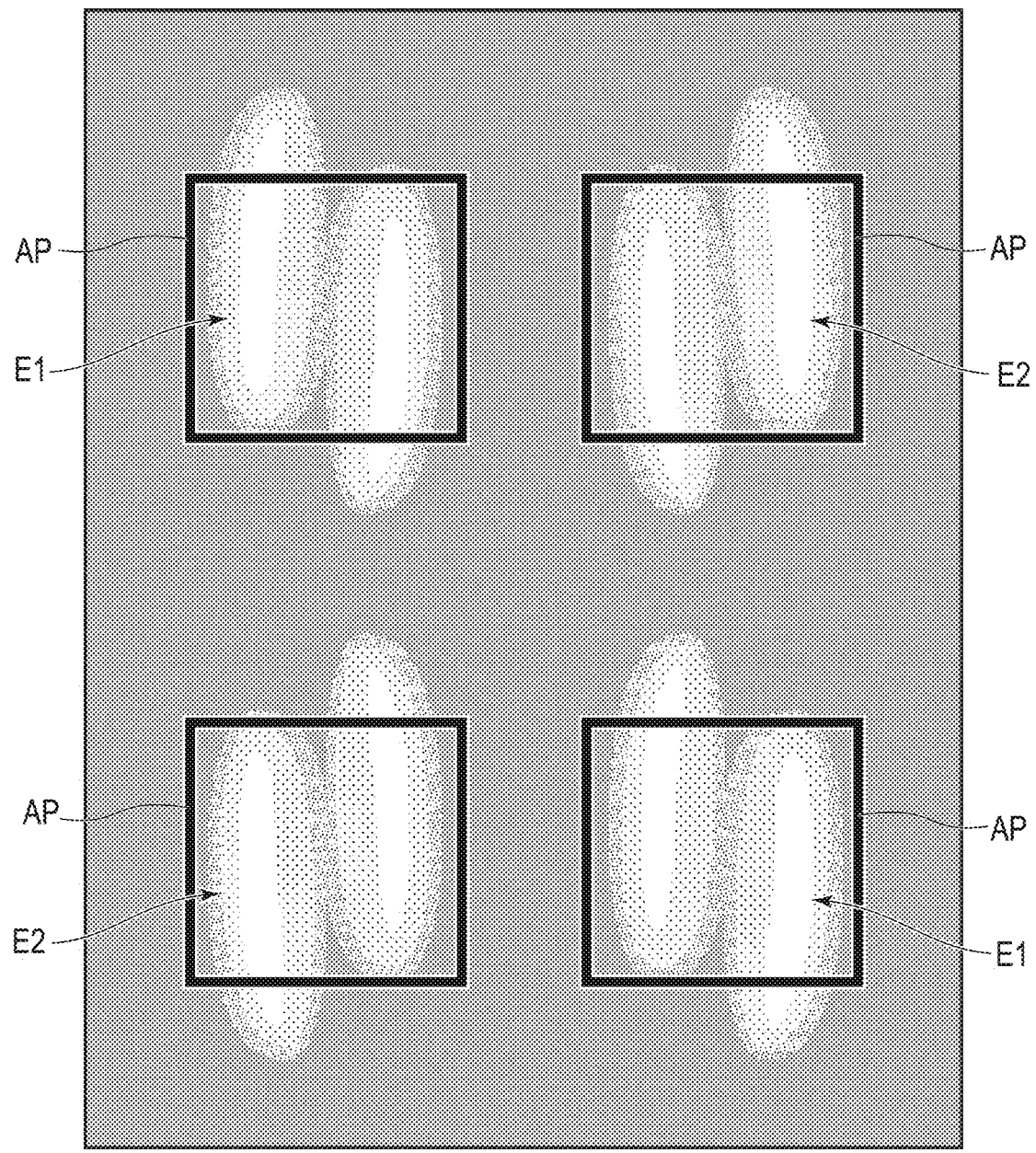
F I G. 20

| | Comparative example | First embodiment | Second embodiment | Third embodiment | Fourth embodiment |
|---|---|---|---|---|---|
| Transmittance rate (5V) | 1.00 | 1.33 | 1.52 | 1.14 | 1.19 |

F I G. 21

LIQUID CRYSTAL DISPLAY DEVICE

CROSS-REFERENCE TO RELATED APPLICATIONS

This application is a continuation of U.S. application Ser. No. 17/651,090, filed Feb. 15, 2022, which is a Continuation Application of PCT Application No. PCT/JP2020/022447, filed Jun. 5, 2020 and which is based upon and claiming the benefit of priority from Japanese Patent Application No. 2019-152171, filed Aug. 22, 2019, the entire contents of all of which are incorporated herein by reference.

FIELD

Embodiments described herein relate generally to a liquid crystal display device.

BACKGROUND

As an example of the display devices, liquid crystal display devices are known. For example, liquid crystal display devices comprise a first substrate containing pixel electrodes and common electrodes, a second substrate opposing the first substrate and a liquid crystal layer disposed between the substrates.

In order to improve the display quality in a liquid crystal display device with high-definition pixels, pixel electrodes and common electrodes having fine shapes are required. However, due to the limitations of processing technology for the line and space (L/S) of the pixels and common electrodes, it may not be possible in some cases to achieve the desired shape.

BRIEF DESCRIPTION OF THE DRAWINGS

FIG. 3 is a schematic plan view of an example of a pixel layout applicable to the display device according to the first embodiment.

FIG. 6 is a schematic plan view of the pixel electrodes, the first common electrode, the second common electrode and the metal layer in the first embodiment, which are place to overlap each other.

FIG. 14 is a schematic plan view of pixel electrodes, the first common electrode, a second common electrode and a metal layer in the third embodiment, which are place to overlap each other.

FIG. 20 is a diagram showing results of simulation of the transmittance distribution in the configuration shown in FIG. 19.

FIG. 21 is a table for comparing the comparative examples and each of the embodiments in transmittance.

DETAILED DESCRIPTION

Figure 1:
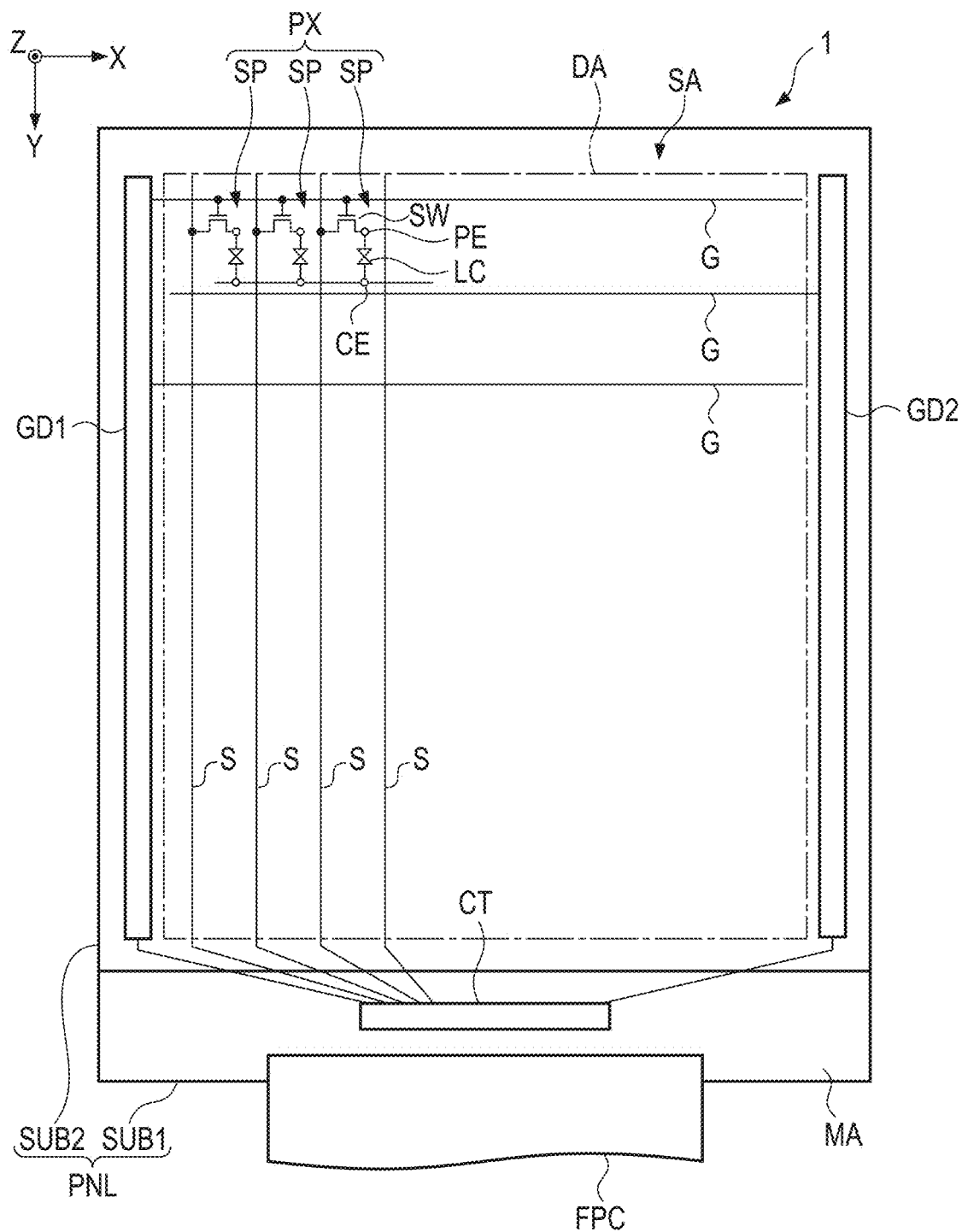
FIG. 1 is a diagram showing an example of a liquid crystal display device according to the first embodiment.

In general, according to one embodiment, a liquid crystal display device comprises a first substrate, a second substrate opposing the first substrate and a liquid crystal layer between the first substrate and the second substrate. The first substrate includes a scanning line extending in a first direction, a signal line extending in a second direction intersecting the first direction, a plurality of pixel electrodes including a first pixel electrode and a second pixel electrode, and a common electrode disposed between the pixel electrodes and the liquid crystal layer. The common electrode includes a plurality of sub-electrodes extending in one of the first direction and the second direction. Each of the plurality of sub-electrodes includes first portions having a width greater than that of the scanning line or the signal line, and second portions having a width less than that of the first portions but greater than that of the scanning line or the signal line. The first portions and the second portions are alternately arranged along a direction in which the plurality of sub-electrodes extend.

According to such a configuration, a display device with excellent display quality can be provided. Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In each embodiment, a liquid crystal display device comprising a liquid crystal layer is disclosed as an example of the display devices. Incidentally, each embodiment does not prevent application of individual technical ideas disclosed in each embodiment to display devices comprising other types of display elements. Note that examples of the display devices comprising other types of display elements are a self-luminous display device comprising an organic electroluminescent (EL) display element or a light-emitting diode (LED) display element, an electronic paper display device comprising an electrophoretic element, a display device to which the micro-electromechanical systems (MEMS) is applied, and a display device to which the electrochromism is applied.

First Embodiment

FIG. 1 is a diagram showing an example of a liquid crystal display device 1 (hereinafter referred to as the display device 1). In this embodiment, X, Y and Z directions are defined as shown in this figure. The X direction, the Y direction and the Z direction are orthogonal to each other, but may intersect at an angle other than 90°. In the following descriptions, viewing the display device 1 parallel to the Z direction will be referred to as planar view.

The display device 1 comprises a display panel PNL, an electronic component CT and a flexible circuit board FPC. The display panel PNL comprises a first substrate SUB1 (array substrate) and a second substrate SUB2 (counter substrate) opposing the first substrate SUB1 and a liquid crystal layer LC disposed between the substrates SUB1 and SUB2.

The display panel PNL includes a display area DA which displays images and a peripheral area SA surrounding the display area DA. The first substrate SUB1 includes a mounting area MA that protrudes from the second substrate SUB2. The mounting area MA is included in the peripheral area SA.

Further, the display panel PNL comprises a plurality of scanning lines G, a plurality of signal lines S, a first scanning driver GD1, and the second scanning driver GD2. The scanning lines G each extend along the X direction in the display area DA and are aligned along the Y direction. The signal lines S each extend along the Y direction in the display area DA and are aligned along the X direction. Each of the scanning lines G is connected to one of the scanning drivers GD1 and GD2. Note that each may be connected to both of the scanning drivers GD1 and GD2.

In each of the regions defined by partitions of a respective adjacent pair of scanning lines G and a respective adjacent pair of signal lines S, a respective sub-pixel SP is formed. A plurality of sub-pixels SP of different display colors constitute one pixel PX, which is the minimum unit for color image display.

Each sub-pixel SP includes a switching element SW and a pixel electrode PE connected to the switching element SW. When a scanning signal is supplied to the scanning line G corresponding to the sub-pixel SP, the switching element SW applies the voltage of the signal line S (pixel voltage) corresponding to the sub-pixel SP to the pixel electrode PE. The pixel electrode PE generates an electric field between itself and the common electrode CE to which the common voltage is applied. For example, the common electrode CE extends over a plurality of sub-pixels SP. When the electric field in each sub-pixel SP acts on the liquid crystal layer LC, a corresponding image is displayed on the display area DA.

The electronic component CT and the flexible circuit board FPC are mounted on the mounting area MA. Image data representing an image to be displayed on the display area DA is supplied to the electronic component CT via the flexible circuit board FPC. The electronic component CT supplies a voltage corresponding to the supplied video data to each signal line S. The electronic component CT functions as a controller which controls the display device 1.

Figure 2:
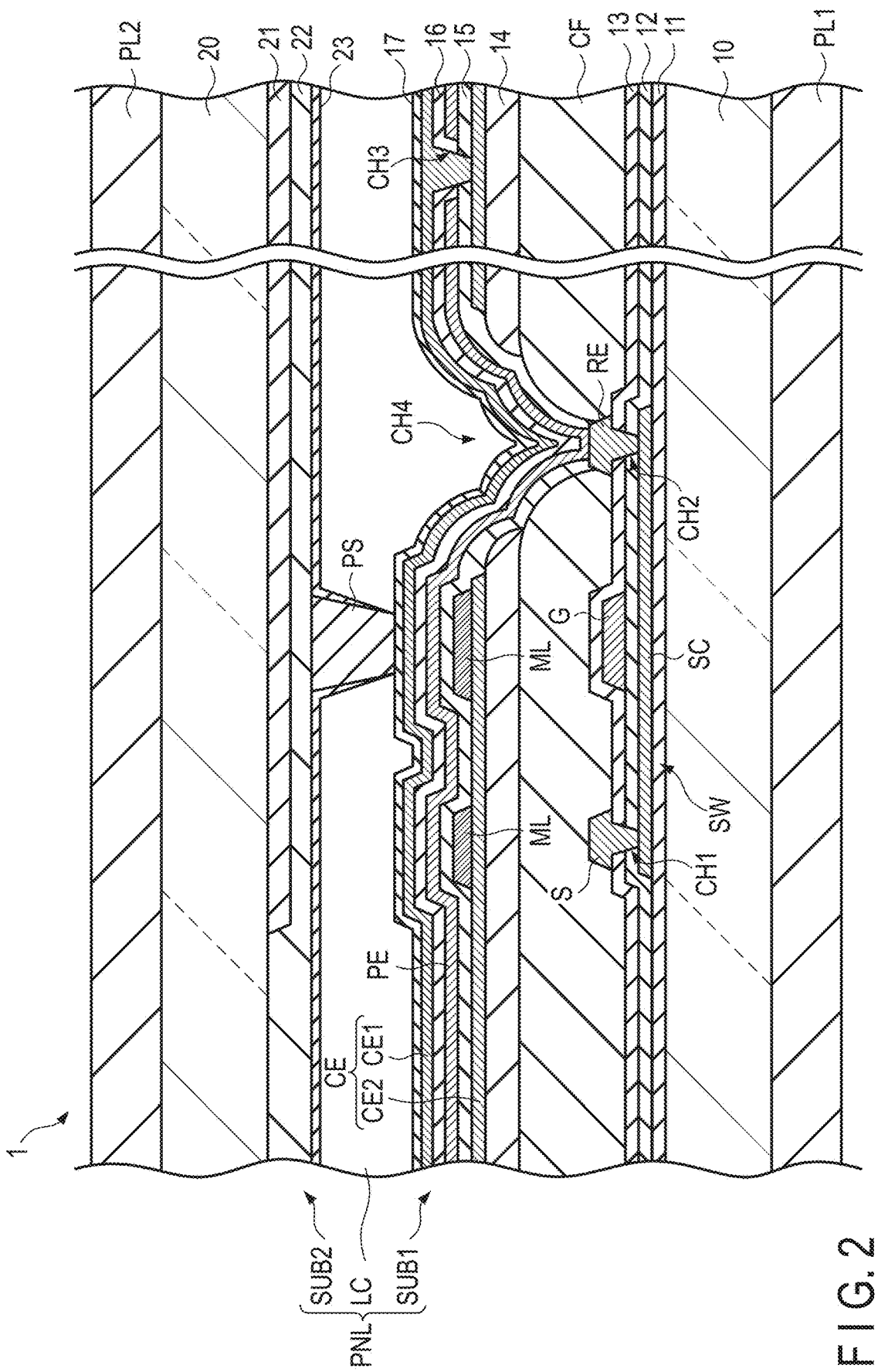
FIG. 2 is a schematic cross-sectional view of the liquid crystal display device according to the first embodiment.

FIG. 2 is a schematic cross-sectional view of the display device 1 in the display area DA. The first substrate SUB1 comprises a first insulating substrate first to sixth insulating layers 11 to 16, a first alignment film 17, a color filter layer CF, scanning lines G, signal lines S, pixel electrodes PE, common electrodes CE, switching elements SW and a metal layer ML. The switching elements SW each comprise a semiconductor layer SC and a relay electrode RE.

In the example illustrated in FIG. 2, the common electrode CE includes a first common electrode CE1 located between the respective pixel electrode PE and the liquid crystal layer LC and a second common electrode CE2 located below the pixel electrode PE (on a first insulating substrate 110 side).

The first insulating layer 11 covers an upper surface of the first insulating substrate 10. The semiconductor layer SC is disposed on the first insulating layer 11. The second insulating layer 12 covers the semiconductor layer SC and the first insulating layer 11. The scanning lines G are disposed on the second insulating layer 12. The third insulating layer 13 covers the scanning lines G and the second insulating layer 12. The signal lines S and the relay electrodes RE are disposed on the third insulating layer 13. The color filter layer CF covers the signal lines S, the relay electrodes RE and the third insulating layer 13. The fourth insulating layer 14 covers the color filter layer CF.

The second common electrode CE2 is disposed on the fourth insulating layer 14. The metal layer ML is disposed on the second common electrode CE2 and opposes the respective scanning line G and the respective signal line S. The fifth insulating layer 15 covers the second common electrode CE2 and the metal layer ML. The pixel electrode PE is placed on the fifth insulating layer 15 and opposes the second common electrode CE2. The sixth insulating layer 16 covers the pixel electrode PE. The first common electrode CE1 is placed on the sixth insulating layer 16 and opposes the pixel electrode PE. The first alignment film 17 covers the first common electrode CE1.

The signal line S is in contact with the semiconductor layer SC via a first contact hole CH1 which penetrate the insulating layer 12 and 13. The relay electrode RE is in contact with the semiconductor layer SC via a second contact hole CH2 which penetrate the insulating layers 12 and 13. The scanning line G opposes the semiconductor layer SC between the contact holes CH1 and CH2. The first common electrode CE1 is in contact with the second common electrode CE2 via a third contact hole CH3 which penetrates the insulating layers 15 and 16. The pixel electrode PE is in contact with the relay electrode RE via a fourth contact hole CH4 that penetrates the insulating layers 14 and 15 and the color filter layer CF.

The second substrate SUB2 comprises a second insulating substrate 20, a light-shielding layer 21, an overcoat layer 22 and a second alignment film 23. The light-shielding layer 21 is disposed on a lower surface of the second insulating substrate 20. The overcoat layer 22 covers the light-shielding layer 21 and the lower surface of the second insulating substrate 20. The second alignment film 23 covers the overcoat layer 22. Between the first alignment film 17 and the second alignment film 23, a liquid crystal layer LC is disposed.

For each of the insulating substrates 10 and 20, a glass substrate or a resin substrate can be used. For each of the insulating layers 11 to 13, 15 and 16, for example, an oxide film such as SiO or a nitride film such as SiN can be used as appropriate. The fourth insulating layer 14 is made, for example, of an organic material and is thicker than the other insulating layers 11 to 13, thus planarizing unevenness caused by the switching element SW and the like. For each of the pixel electrode PE and the common electrode CE, a transparent conductive material such as indium tin oxide (ITO) can be used. For each of the scanning line G, the signal line S, the relay electrode RE and the metal layer ML, a single-layer or stacked structure of various metals can be applied. The first alignment film 17 and the second alignment film 23 can be formed of polyimide, for example.

In the example illustrated in FIG. 2, the first substrate SUB1 and the second substrate SUB2, a spacer PS is disposed. The spacer PS protrudes, for example, from the second substrate SUB2 toward the first substrate SUB1, and its distal end is in contact with the first substrate SUB1. The spacer PS opposes the light-shielding layer 21. A plurality of such spacers PS are disposed in the display area DA. There may be some spacers PS whose distal ends are not brought into contact with the first substrate SUB1.

The display panel PNL further comprises a first polarizer PL1 and a second polarizer PL2. The first polarizer PL1 is adhered to the first insulating substrate 10. The second polarizer PL2 is adhered to the second insulating substrate 20. For example, the polarization axes of the first polarizer PL1 and the second polarizer PL2 are orthogonal to each other.

Note that the configuration of the display panel PNL is not limited to that of the example illustrated in FIG. 2. For example, the common electrode CE may not comprise the second common electrode CE2. Further, the metal layer ML is located between the fourth insulating layer 14 and the second common electrode CE2, between the first common electrode CE1 and the first alignment film 17, or between the first common electrode CE1 and the first alignment film 17.

FIG. 3 is a schematic plan view showing an example of a pixel layout applicable to the display device 1. In the example illustrated in this figure, each pixel PX comprises a red sub-pixel SP(R), a green sub-pixel SP(G) and a blue sub-pixel SP(B). Along the X direction, the sub-pixels SP(R), SP(G) and SP(B) are arranged in order. Along the Y direction, the sub-pixels SP(R), SP(G) and SP(B) are arranged in sequence.

The above-described filter layer includes a red color filter CFR, which overlaps the red sub-pixel SP(R), a green color filter CFG, which overlaps the green sub-pixel SP(G) and a blue color filter CFB, which overlaps the blue sub-pixel SP(B). These color filters CFR, CFG, and CFB have a shape elongated along the Y direction and are arranged in order along the X direction. The spacer PS is placed at the boundary of the blue sub-pixel SP(B), for example, but the arrangement is not limited to that of this example.

The pixel PX may include sub-pixels of colors other than red, green, and blue, such as white sub-pixels SP and the like. The pixel PX may as well include multiple sub-pixels SP of the same color. The sizes of the sub-pixels SP in the pixel PX may be, for example, the same as each other, but they may be different from each other.

Figure 4:
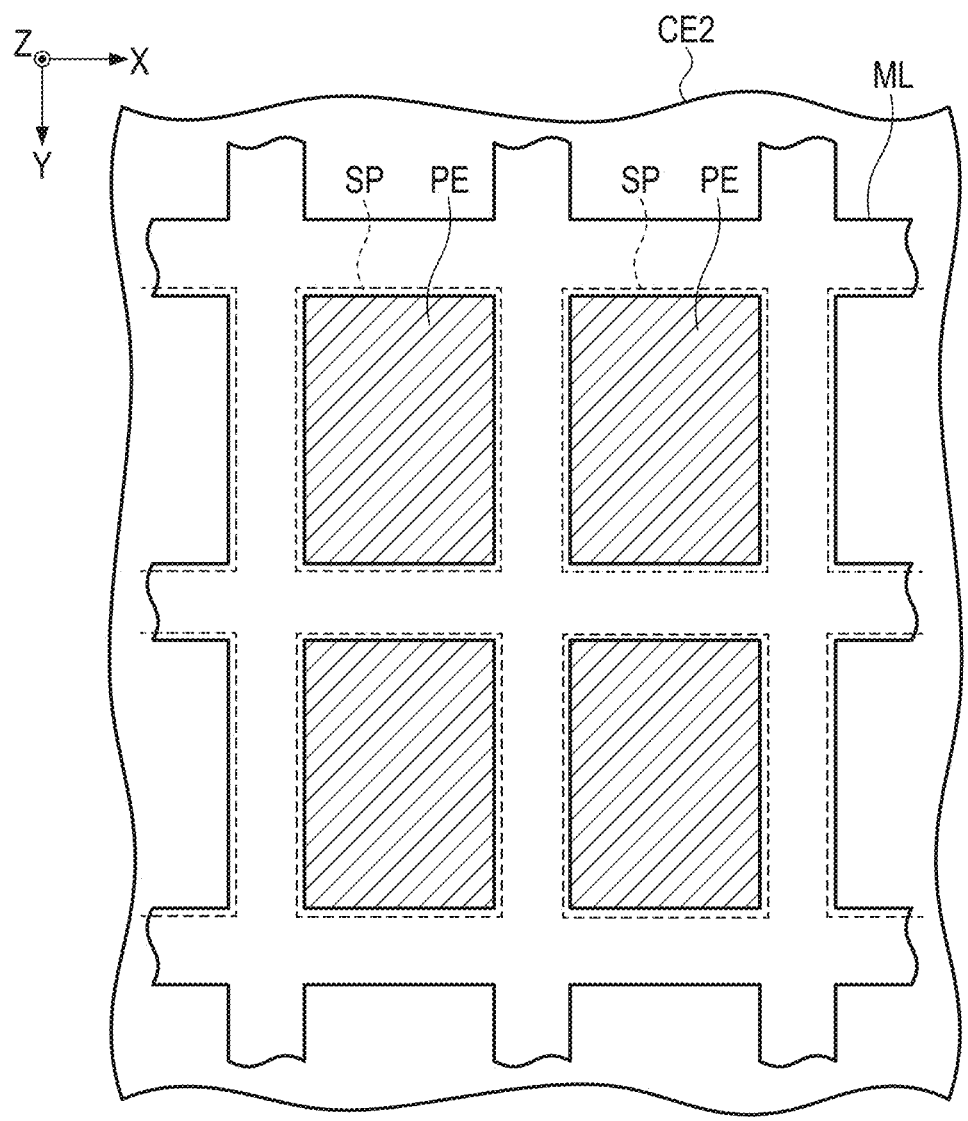
FIG. 4 is a schematic plan view of pixel electrodes, a second common electrode and a metal layer in the first embodiment.

FIG. 4 shows a schematic plan view of the pixel electrodes PE, the second common electrode CE2 and the metal layer ML in this embodiment. The metal layer ML is formed into a grating pattern that runs between adjacent sub-pixels SP, for example. The pixel electrodes PE (the shaded area) does not overlap the metal layer ML. Note, however, that the peripheral portions of the pixel electrodes PE may overlap the metal layer ML. The second common electrode CE2 overlaps the pixel electrodes PE of multiple sub-pixels SP.

Figure 5:
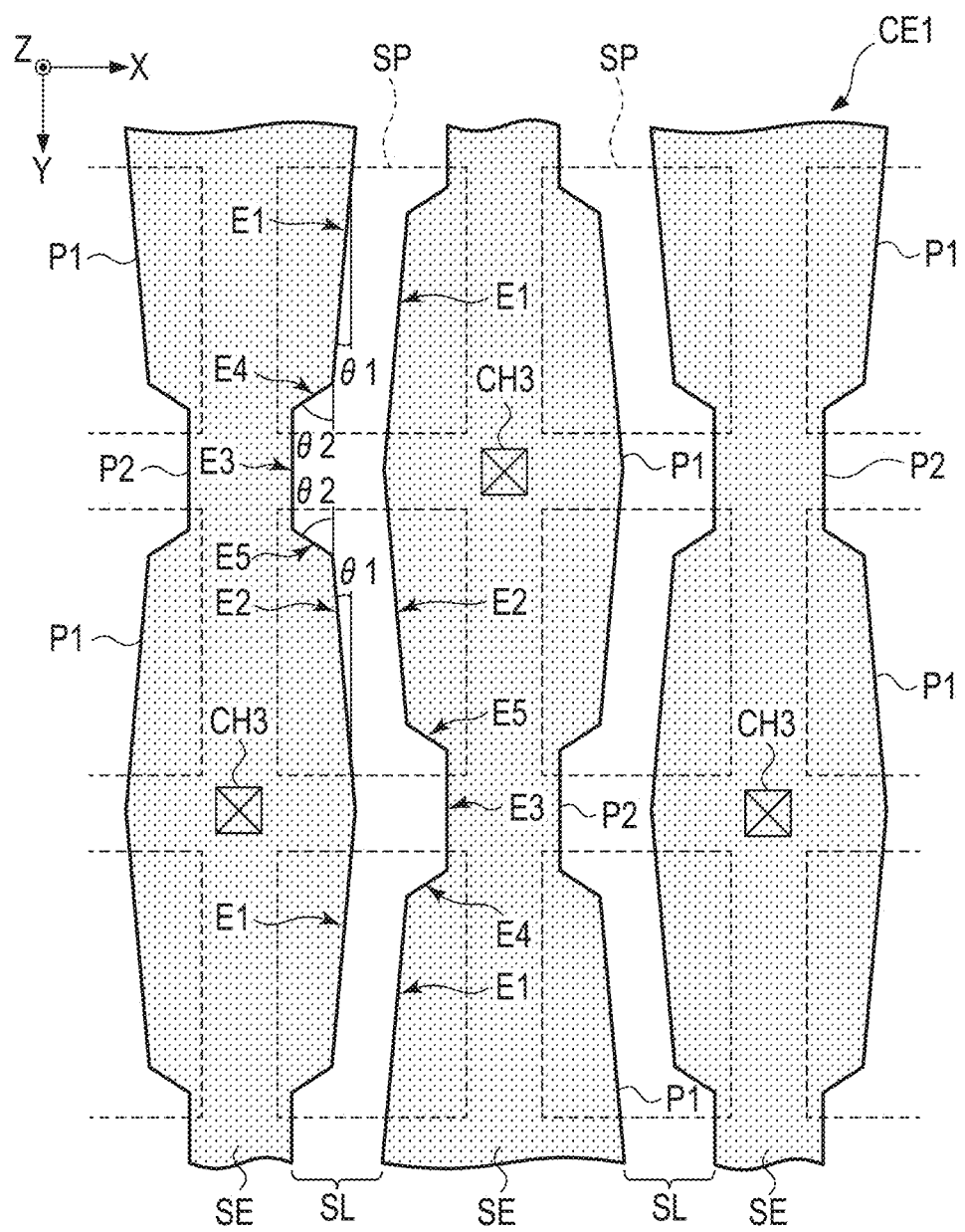
FIG. 5 is a schematic plan view of a first common electrode in the first embodiment.

FIG. 5 is a schematic plan view of the first common electrode CE1 in this embodiment. The first common electrode CE1 includes a plurality of sub-electrodes SE. The sub-electrodes SE are aligned along the X direction with constant intervals therebetween, and extend continuously over a plurality of sub-pixels SP aligned along the Y direction. For example, between the sub-electrode SE located on the left side in FIG. 5 and the sub-electrode SE located in the center in FIG. 5, a gap SL is provided. In other words, each of the sub-electrodes SE is formed into a strip-like shape. The sub-electrodes SE are formed, for example, in such a way that they overlap the signal lines S in planar view, and extend from one end to the other end of the display area DA along the Y direction. As another example, the sub-electrodes SE are formed in such a way that they overlap the scanning lines G in planar view, and extend from one end to the other end of the display area DA along the Y direction.

Each of the sub-electrodes SE is connected to the second common electrode CE2 via the third contact hole CH3 described above. For example, the third contact hole CH3 is provided at a location where the width of the sub-electrode SE along the X direction (the first width) is the largest as shown in FIG. 5. As another example, each sub-electrode SE may be connected to the second common electrode CE 2 or some other wiring line to which a common voltage is applied, in the peripheral area SA.

Each sub-electrode SE includes a plurality of portions P1 containing the position where the width along the X direction is largest, and where the third contact hole CH3 described above is formed, and a plurality of portions P2 connecting the portions P1 to each other. In the example of FIG. 5, the portions P1 are arranged in such a manner that each overlaps two adjacent sub-pixels SP aligned along the X direction and also two adjacent sub-pixels P2 aligned along the Y direction and the third contact hole CH3 is located at the center of these four sub-pixels SP. The portions P2 are each located between the respective portions P1. The portions P2 are narrower than the section of the location where the third contact hole CH3 is formed and are wider (a second width) than the width of the signal lines S along the X direction.

The portions P1 and P2 are alternately aligned along the Y direction. In the sub-electrodes SE shown in the left and right sides in FIG. 5, the portion P2 is located between the upper and middle sub-pixels SP. In the center sub-electrode SE in FIG. 5, the portion P2 is located between the middle and lower sub-pixels SP. In other words, the portions P1 and P2 are aligned alternately along the X direction as well. For example, between the upper and middle sub-pixels SP in FIG. 5, the portion P1 of the center sub-electrode SE is located such as to be interposed between the respective portions P2 of the left and right sub-electrodes SE.

When viewing a wider region of the display area DA, the portions P1 and P2 are arranged in a staggered pattern. The gap SL between each adjacent pair of sub-electrodes SE extends continuously over a plurality of sub-pixels SP aligned along the Y direction. The gap SL between the respective portions P1 of each adjacent pair of sub-electrode SE along the X direction has a first interval. The gap SL between the respective portions P1 and P2 of each adjacent pair of sub-electrode SE SL along the X direction has a second interval which is wider than the first interval.

The portions P1 each include at least a first edge E1 and a second edge E2. The first edge E1 is inclined at an angle θ1 clockwise with respect to the Y direction. The second edge E2 is inclined at an angle θ1 counterclockwise with respect to the Y direction. The angle θ1 is an acute angle and, for example, 15° or less. As shown in FIG. 5, for example, the first and second sides E1 and E2 are connected next to each other along the Y direction and overlap each of those sub-pixels SP adjacent thereto along the Y direction. Further, the sides of the sub-electrode SE, which are inclined in the same direction overlap each other in each sub-pixel SP. For example, in the upper left sub-pixel SP in FIG. 5, the gap SL extends in a direction inclined at an angle θ1 clockwise with respect to the Y direction. On the other hand, in the middle sub-pixel SP on the left side of FIG. 5, the gap SL extends in a direction inclined at an angle θ1 counterclockwise with respect to the Y direction. In other words, in FIG. 5, the gap SL extends in a zigzag pattern along the Y direction. Thus, by forming the sub-electrodes SE so that the gaps SL extend in a zigzag manner, a pseudo multi-domain pixel layout can be realized.

The portion P2 has at least a third edge E3. The third edge E3 extends along the Y direction. As shown in FIG. 5, for example, the third edge E3 overlaps the sub-pixels SP adjacent thereto along the Y direction. In FIG. 5, the portion P2 further includes a fourth edge E4 and a fifth edge E5. The fourth edge E4 is inclined at an angle θ2 clockwise with respect to the Y direction. The fifth edge E5 is inclined at an angle θ2 counterclockwise with respect to the Y direction. The angle θ2 is an acute angle, larger than θ1, for example, 15° or greater but 90° or less. The third edge E3 is located between the fourth edge E4 and the fifth edge E5, and connects the fourth edge E4 and the fifth edge E5 to each other. Further, the fourth edge E4 and the fifth edge E5 are connected to the first and second edges E1 and E2, respectively, which are inclined in the same direction.

FIG. 6 is a schematic plan view showing the state where the pixel electrode PE, the first common electrode CE1, the second common electrode and the metal layer ML are stacked. The dotted area is the area where the common voltage is applied, and the shaded area is the area where the pixel voltage is applied via the respective signal line S.

The portion P1 of the sub-electrodes SE overlaps the respective pixel electrode PE (the first pixel electrode). The first edge E1 of the portion P1 overlaps the respective pixel electrode PE (the first pixel electrode). The second edge E2 of the portion P1 overlaps another pixel electrode PE (the second pixel electrode). The second portion P2 as well overlaps the pixel electrode PE (the first pixel electrode), and also another pixel electrode PE (the second pixel electrode).

From another point of view, the gaps SL between the sub-electrodes SE overlap the pixel electrodes PE, respectively.

The light-shielding layer 21 described above comprises apertures AP that respectively overlap the pixel electrodes PE. In the example illustrated in FIG. 6, the apertures AP overlap the portion P2 or portion P2 and the gaps SL.

The metal layer ML and the second common electrode CE2 located therebelow overlap the sub-electrode SE and the gap SL between the pixel electrodes PE aligned along the Y direction. The metal layer ML and the second common electrode CE2 are at the same potential as that of the first common electrode CE1.

The first alignment film 17 and the second alignment film 23 described above align the liquid crystal molecules LM contained in the liquid crystal layer LC along an initial alignment direction AL. The initial alignment direction AL in this embodiment is parallel to the Y direction. Further, the liquid crystal molecules LM in this embodiment have positive (+) dielectric constant anisotropy. Therefore, when voltage is applied between the pixel electrode PE and the common electrode CE (CE1, CE2), a force is exerted to rotate the liquid crystal molecules LM such that their longitudinal axes become parallel to the direction of the electric field generated by the voltage (or orthogonal to the equipotential line).

Let us focus, for example, on the pixel electrode PE shown in the upper left section of FIG. 6. Here, in the first edge E1 of the first portion P1, the liquid crystal molecules LM rotate in the counterclockwise first rotation direction R1. In particular, in a corner C made by the portion P1 and the portion P2, a strong force acts to rotate the liquid crystal molecules LM in the first rotational direction R1, and therefore the alignment in the portion P1 is stabilized. Note that in the portion P2, some of the liquid crystal molecules LM rotate in a second rotation direction R2, which is opposite to the first rotation direction R1.

Figure 7:
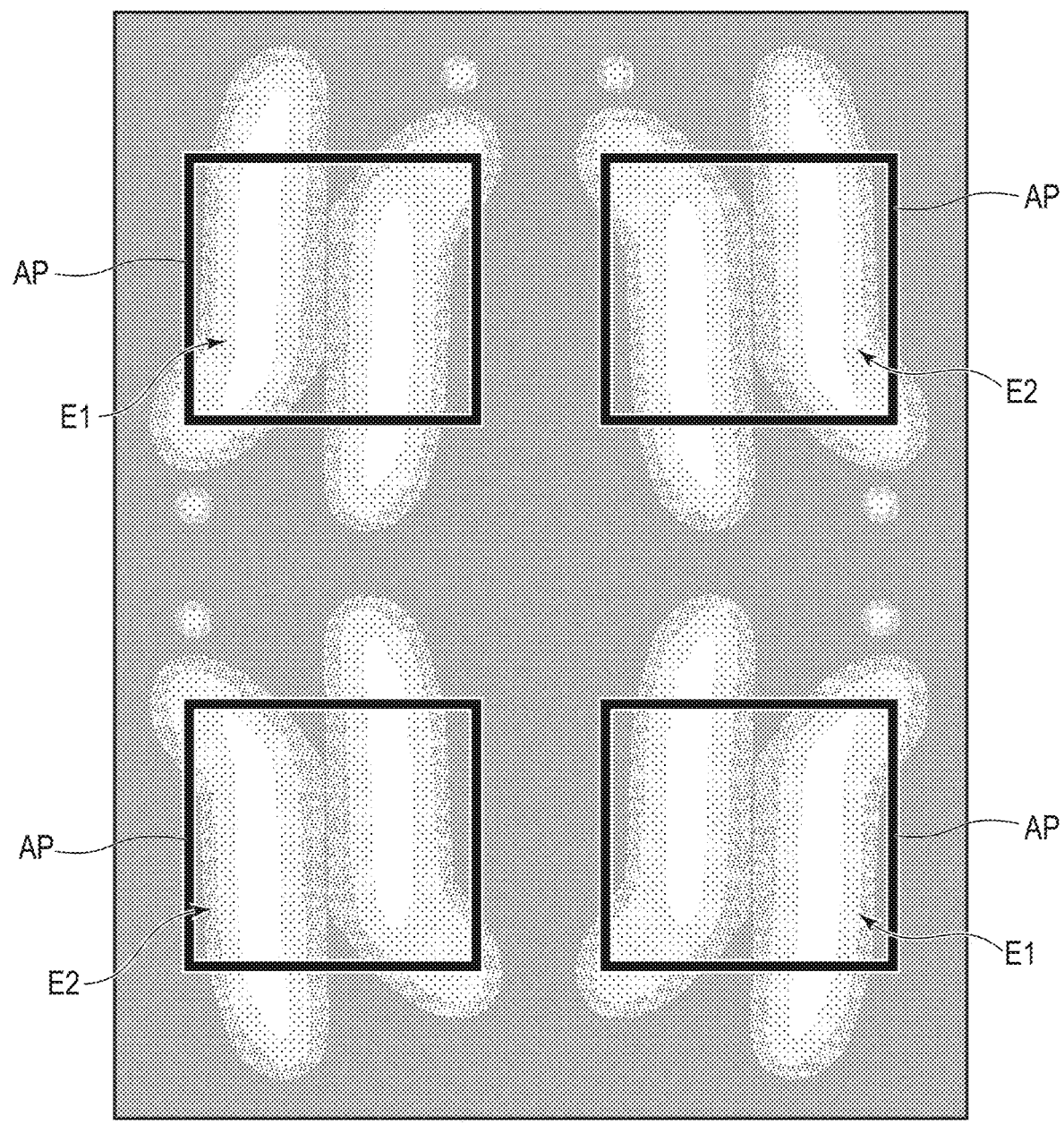
FIG. 7 is a diagram showing results of simulation of transmittance distribution in the configuration shown in FIG. 6.

FIG. 7 is a diagram showing simulation results of the transmittance distribution when a potential difference of 5 V is created between the pixel electrode PE and the common electrode CE in the configuration shown in FIG. 6. In the diagram, as the area is whiter, the transmittance is higher, whereas as the area is darker, the transmittance is lower. In this diagram, the ranges of the apertures AP are shown as well.

In the area overlapping the aperture AP, the liquid crystal molecules LM rotate stably in the same direction in the first edge E1, and therefore the transmittance is high. The transmittance is also high in the second edge E2 because the liquid crystal molecules rotate stably in the same direction.

Note that in the third edge E3 of the portion P2, the transmittance may decrease because the rotation directions of the liquid crystal molecules are irregular. However, such an area is out of the respective aperture AP and causes no substantial effect on the display quality.

Figure 8:
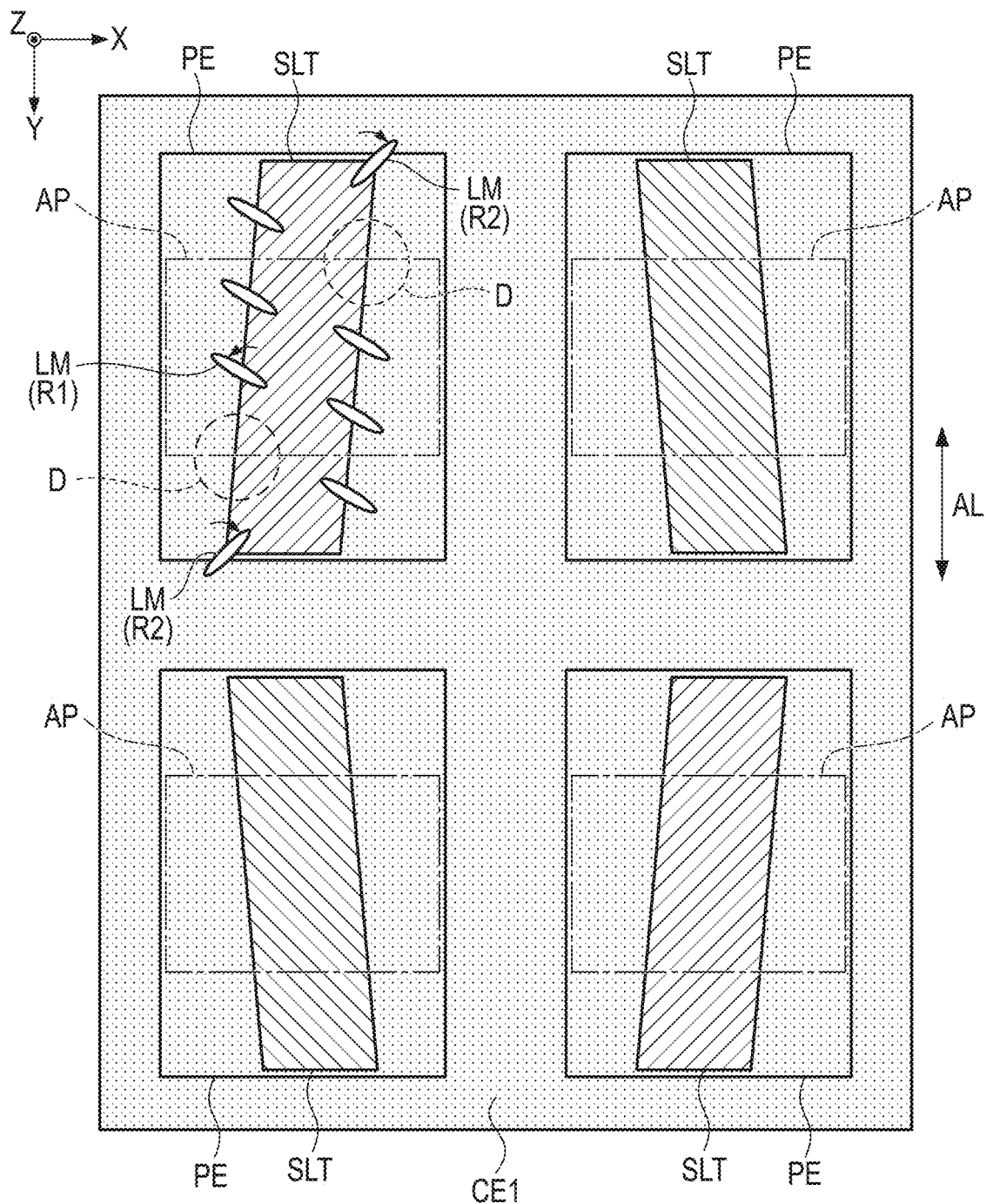
FIG. 8 is a schematic plan view showing the configuration of a display device according to a comparative example.
Figure 9:
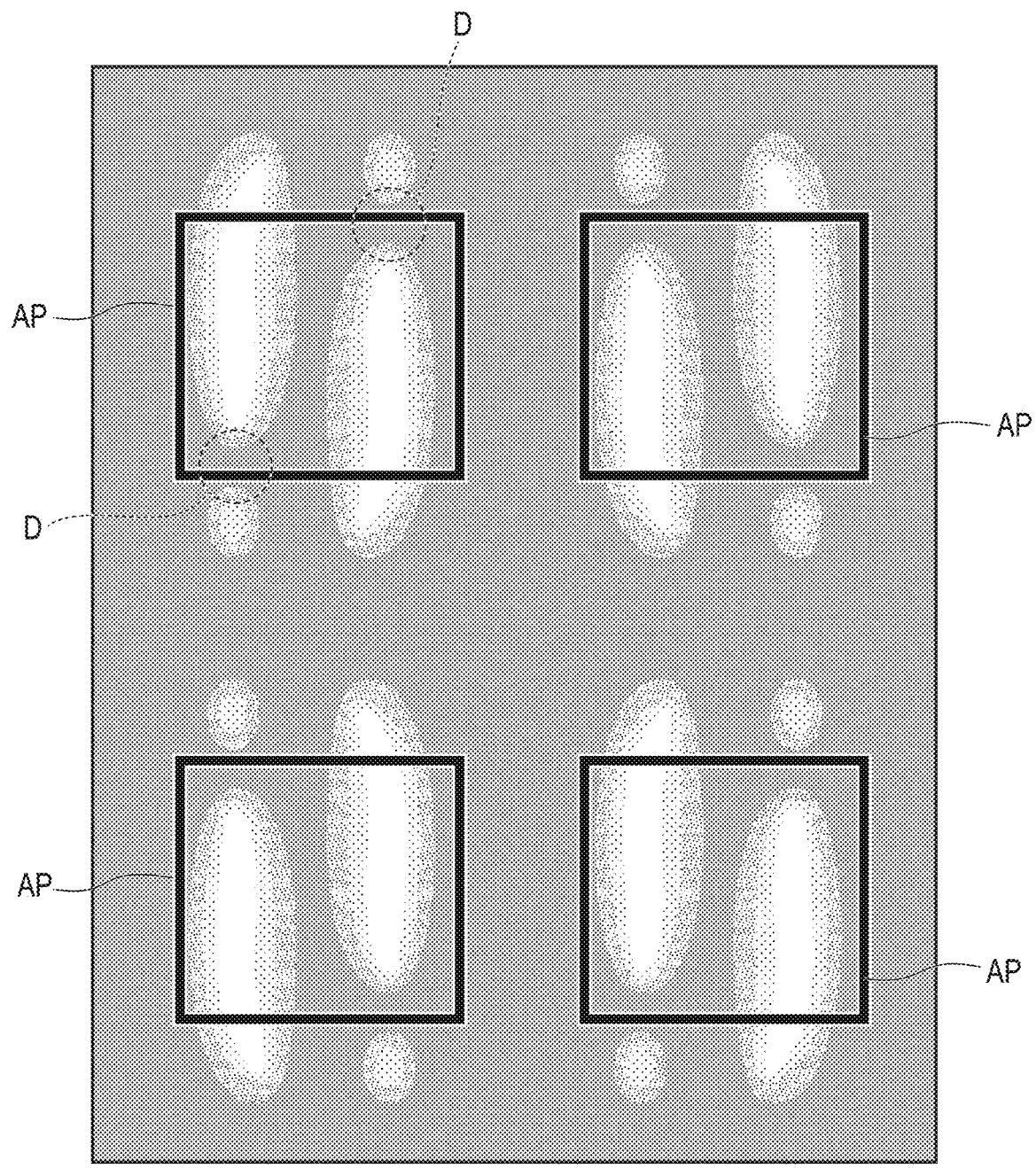
FIG. 9 is a diagram showing results of simulation of the transmittance distribution in the configuration shown in FIG. 8.

Here, a comparative example to this embodiment will be described. FIG. 8 is a schematic plan view showing the configuration of a display device according to a comparative example. FIG. 9 is a diagram showing simulation results of the transmittance distribution when a potential difference of 5 V is created between the pixel electrode PE and the common electrode CE in the configuration shown in FIG. 8.

In the comparative example, the first common electrode CE1 comprises slits SLT each for the respective pixel electrode PE. The slits SLT are similar in shape to the gaps SL.

In this case, in the midsection of each slit SLT along the Y direction, the liquid crystal molecules LM rotate in the same direction as in the example shown in FIG. 6. However, at both ends of the slit SLT along the Y direction, the liquid crystal molecules LM rotate in the opposite direction. In a domain D between the liquid crystal molecules rotating in the opposite directions, the rotation of the liquid crystal molecules LM is suppressed.

In FIG. 9, the rotation of the liquid crystal molecules is suppressed in the domain D, and therefore the transmittance is significantly reduced in the domain D. The domain D overlaps the respective aperture AP as well. Therefore, the transmittance of the display device is lowered, which in turn reduces the brightness of the image, thus resulting in lower display quality.

By contrast, in the configuration of the embodiment shown in FIG. 6, the gaps SL are formed over a plurality of pixel electrodes PE aligned along the Y direction. With this configuration, low transmittance (low brightness) areas cannot be easily formed in the apertures AP and their vicinities.

Further, in this embodiment, each gap SL includes a second interval at each location corresponding to the respective portion P2, and therefore, as described above, the alignment in the first edge E1 and the second edge E2 is stabilized, thus making it possible to further enhance the transmittance.

Moreover, in this embodiment, the color filter layers CF are disposed on the first substrate SUB1. With this configuration, even if the first substrate SUB1 and the second substrate SUB2 are misaligned, color mixing of adjacent sub-pixels SP is unlikely to occur.

Furthermore, the metal layer ML is placed between the sub-pixels SP in both the X and Y directions. Therefore, color mixing of adjacent sub-pixels SP can be further suppressed.

If the shape of the area where the pixel voltage is applied (the shaded area) in FIG. 6 were to be realized using only the slit (gap) of the first common electrode CE1, high processing accuracy would be required. In particular, in high-definition display devices with a resolution of over 1000 ppi, it is extremely difficult to process the slit due to the limitation of L/S in manufacturing technology. By contrast, in this embodiment, the shape of the area where the pixel voltage is applied can be realized by overlapping the first common electrode CE1, the second common electrode CE2 and the metal layer ML with each other. In this case, the shape of the area to which the pixel voltage is applied can be created with high accuracy.

Second Embodiment

The second embodiment will now be described. Note that unless a configuration is not specifically described, a configuration similar to that of the first embodiment can be applied thereto.

Figure 10:
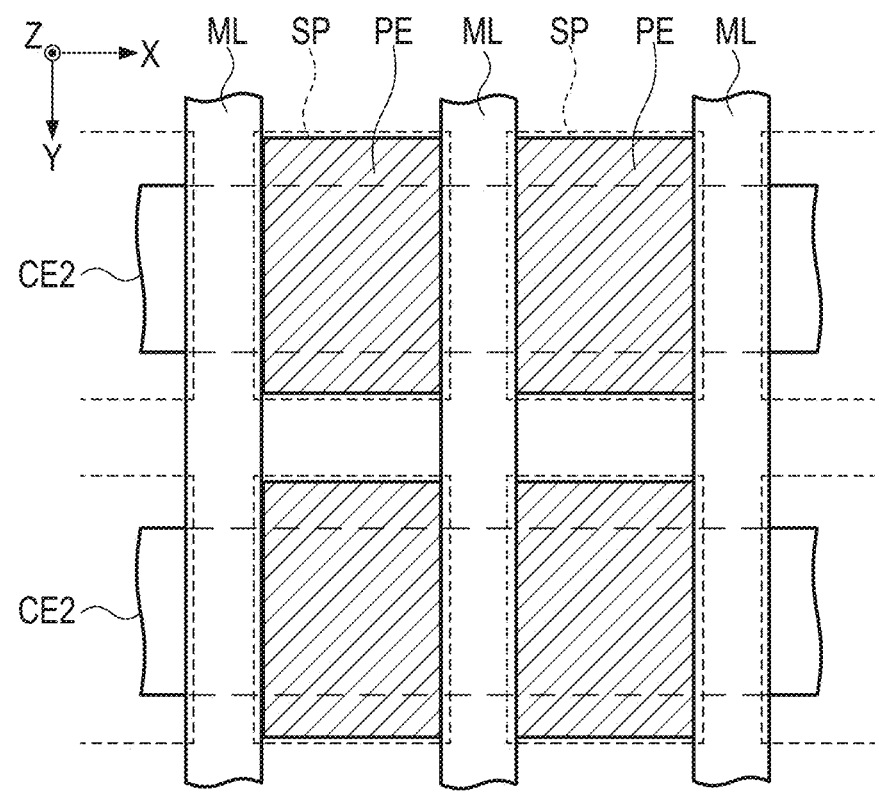
FIG. 10 is a schematic plan view of pixel electrodes and a metal layer in the second embodiment.

FIG. 10 is a schematic plan view of pixel electrodes PE and metal layers ML in this embodiment. In this embodiment, the metal layers ML are each provided between respective pairs of pixel electrodes PE adjacent to each other along the X direction, but not between respective pixel electrodes PE adjacent to each other along the Y direction.

Second common electrodes CE2 extend along the X direction, for example, below the respective pixel electrodes PE. Each metal layer ML is in contact with the second common electrodes CE2. The second common electrodes CE2 are each not provided between respective adjacent pixel electrodes PE along the Y direction.

Figure 11:
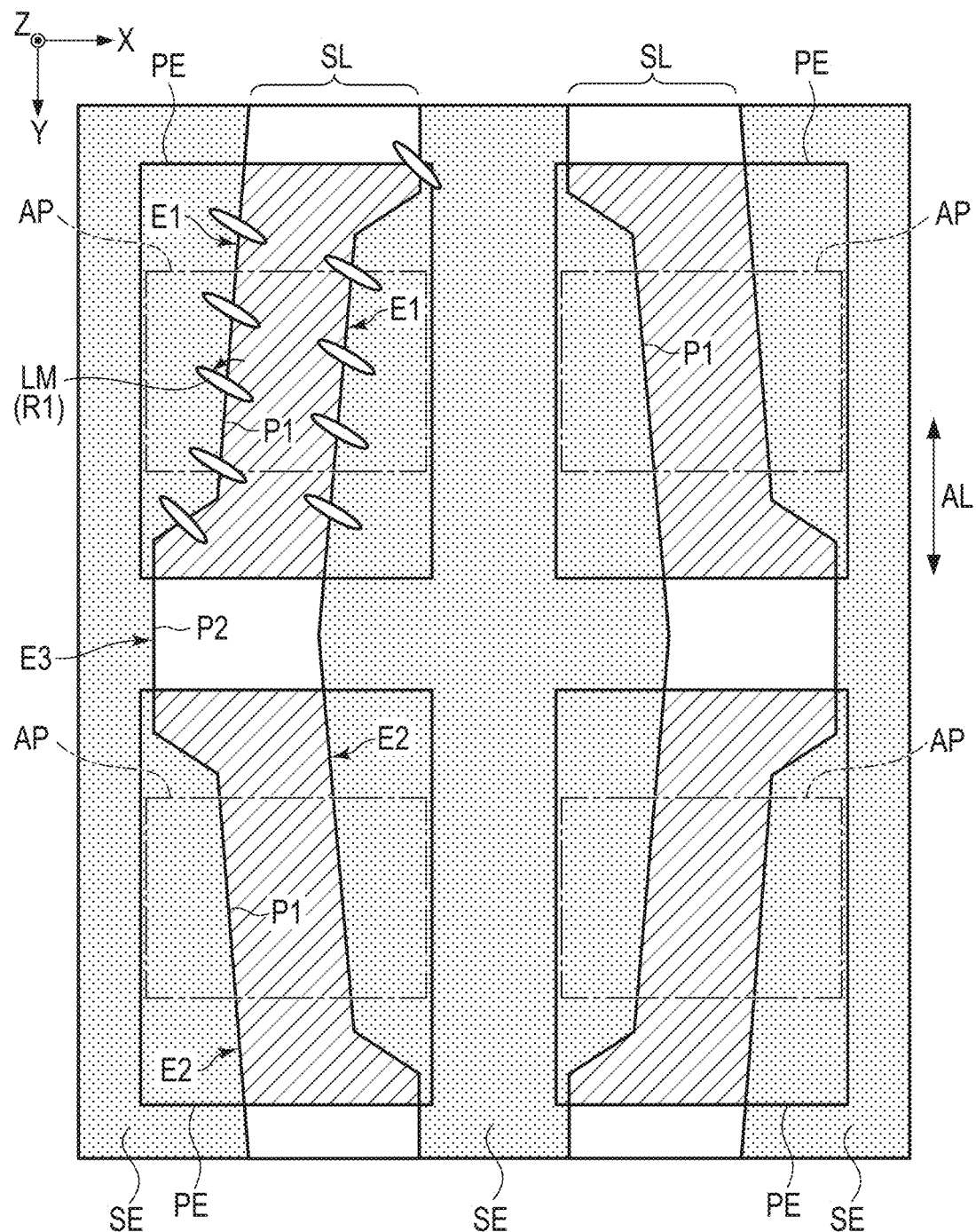
FIG. 11 is a schematic plan view of the pixel electrodes, the first common electrode, the second common electrode and the metal layer in the second embodiment, which are place to overlap each other.
Figure 12:
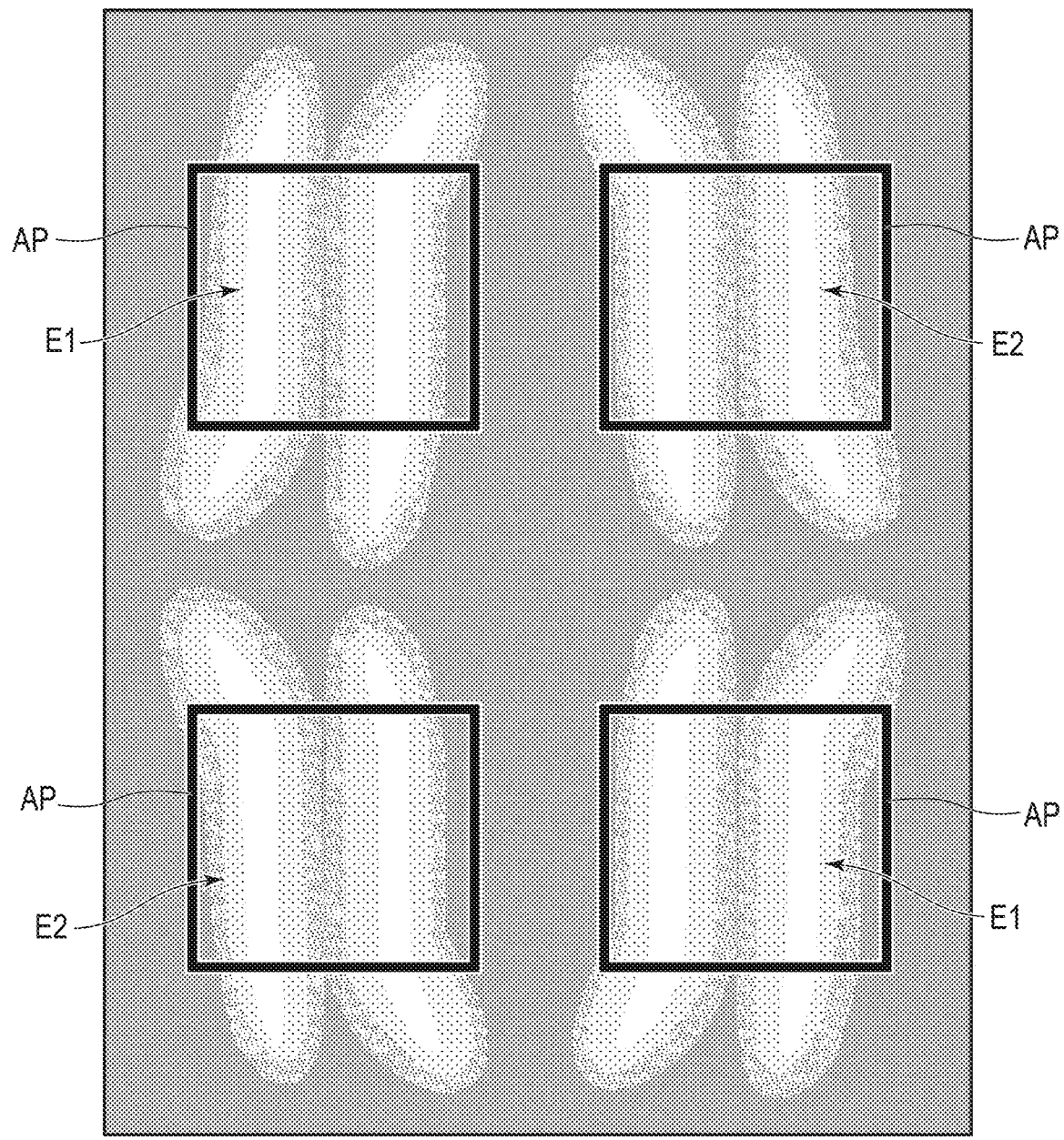
FIG. 12 is a diagram showing results of simulation of the transmittance distribution in the configuration shown in FIG. 11.

FIG. 11 is a schematic plan view showing the pixel electrodes PE, the first common electrode CE1, the second common electrode CE2 and the metal layers ML, which are stacked. FIG. 12 is a diagram showing simulation results of the transmittance distribution when a potential difference of 5 V is created between the pixel electrodes PE and the common electrodes CE in the configuration shown in FIG. 11.

In the example illustrated in FIG. 11, the shapes of gaps SL and sub-electrodes SE are the same as those shown in FIGS. 5 and 6. In this embodiment, between each pair of pixel electrodes PE adjacent to each other along the Y direction a conductive layer (the metal layer M) having the same potential as that of the common electrode CE is not provided. Therefore, no common voltage is applied to the area between each pair of two pixel electrodes PE adjacent to each other along the Y direction.

With this configuration, the rotation directions of the liquid crystal molecules LM are regulated even near the edges of the pixel electrodes PE, and as shown in FIG. 12, the areas of high transmittance in each aperture AP and in its vicinity are reinforced. As a result, the transmittance and brightness of the display device 1 can be enhanced.

Note that in this embodiment, no metal layers ML are placed between the sub-pixels SP adjacent to each other along the Y direction, and therefore there is a possibility that light having passed through the color filter of one of these sub-pixels SP may pass through the liquid crystal layer LC of the other sub-pixel SP. However, in the pixel layout shown in FIG. 3, the sub-pixels SP of the same color are aligned along the Y direction, even if such light is generated, no substantial effect is created on the display quality.

Third Embodiment

The third embodiment will now be described. Note that unless a configuration is not specifically described, configurations similar to those of the already provided embodiments can be applied thereto.

Figure 13:
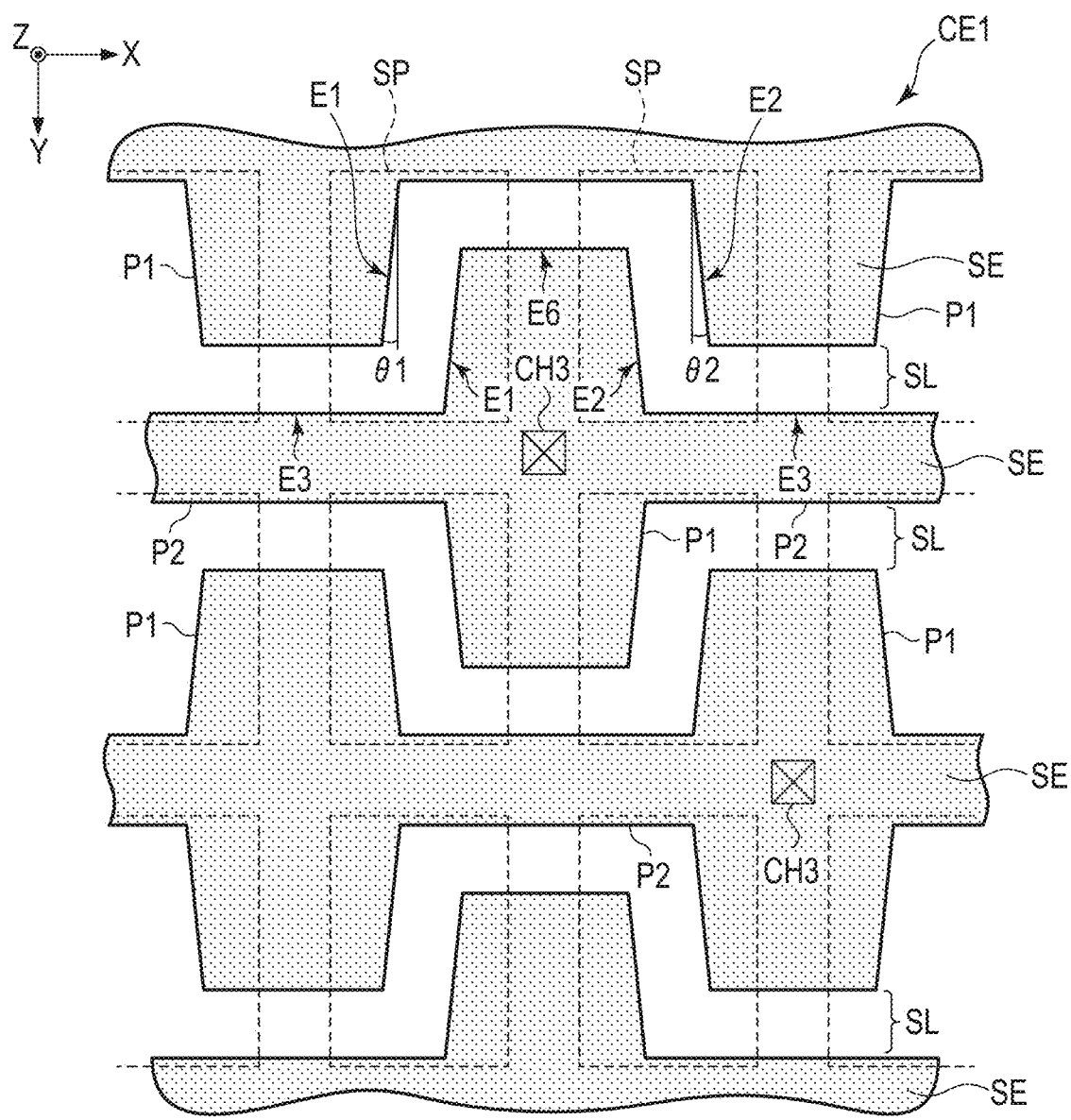
FIG. 13 is a schematic plan view of a first common electrode in the third embodiment.

FIG. 13 is a schematic plan view of a first common electrode CE1 in this embodiment. Gaps SL in this embodiment extend continuously over a plurality of sub-pixels SP aligned along the X direction.

The gaps SL may extend from one end of the display area DA to the other end along the X direction. As another example, the gaps SL may overlap some of the sub-pixels SP aligned between one end and the other end of the display area DA along the X-direction. In this case, a plurality of gaps SL may be aligned along the X direction.

Each sub-electrode SE is connected to the second common electrode CE2 by the third contact hole CH3 described above. For example, as shown in FIG. 13, the third contact hole CH3 is provided at a location of the respective sub-electrode SP, where it is the widest along the Y direction. As another example, each sub-electrode SE may be connected to the second common electrode CE2 or some other wiring line to which a common voltage is applied in the peripheral area SA.

As in each of the above embodiments, each sub-electrode SE includes a plurality of portions P1 each containing a location where the width along the X direction is largest, where the above-described third contact hole CH3 is formed, and a plurality of portions P2 connecting the portions P1. The portions P1 are arranged such that each overlaps two sub-pixels SP aligned along the X direction and two sub-pixels SP aligned along the Y direction, and the third contact hole CH3 is located at the center of the arrangement of the four sub-pixels. Each portion P2 is located between respective portions P1. The width of the portion P2 is narrower than the width of the portion P1 in the Y direction at the position where the third contact hole CH3 is formed, and wider than the scanning lines G along the Y direction. The portions P1 and P2 are alternately arranged along the X direction. The portions P1 each include a first edge E1 inclined at an angle θ1 clockwise with respect to the Y direction and a second edge E2 inclined at an angle θ1 counterclockwise with respect to the Y direction. The angle θ1 is an acute angle and, for example, 15° or less.

When viewing a wider range in the display area DA, the portions P1 and P2 are arranged in a staggered pattern. The gaps SL each between respective pairs of sub-electrodes SE extend continuously over a plurality of sub-pixels SP aligned along the X direction. The gap SL taken along the Y direction between each respective pair of sub-electrodes SE has a first interval.

The portions P2 each include at least a third edge E3. The third edge E3 extends along the X direction. As shown in FIG. 13, for example, the third edge E3 overlaps the sub-pixel SP adjacent thereto along the X direction. In FIG. 13, the portions P1 each further include a sixth edge E6 that is parallel to the third edge E3. The sixth edge E6 is located between the first edge E1 and the second edge E2, and connects the first and second edges E1 and E2 to each other. The sixth edge E6 overlaps the sub-pixel SP adjacent thereto along the X direction.

Figure 15:
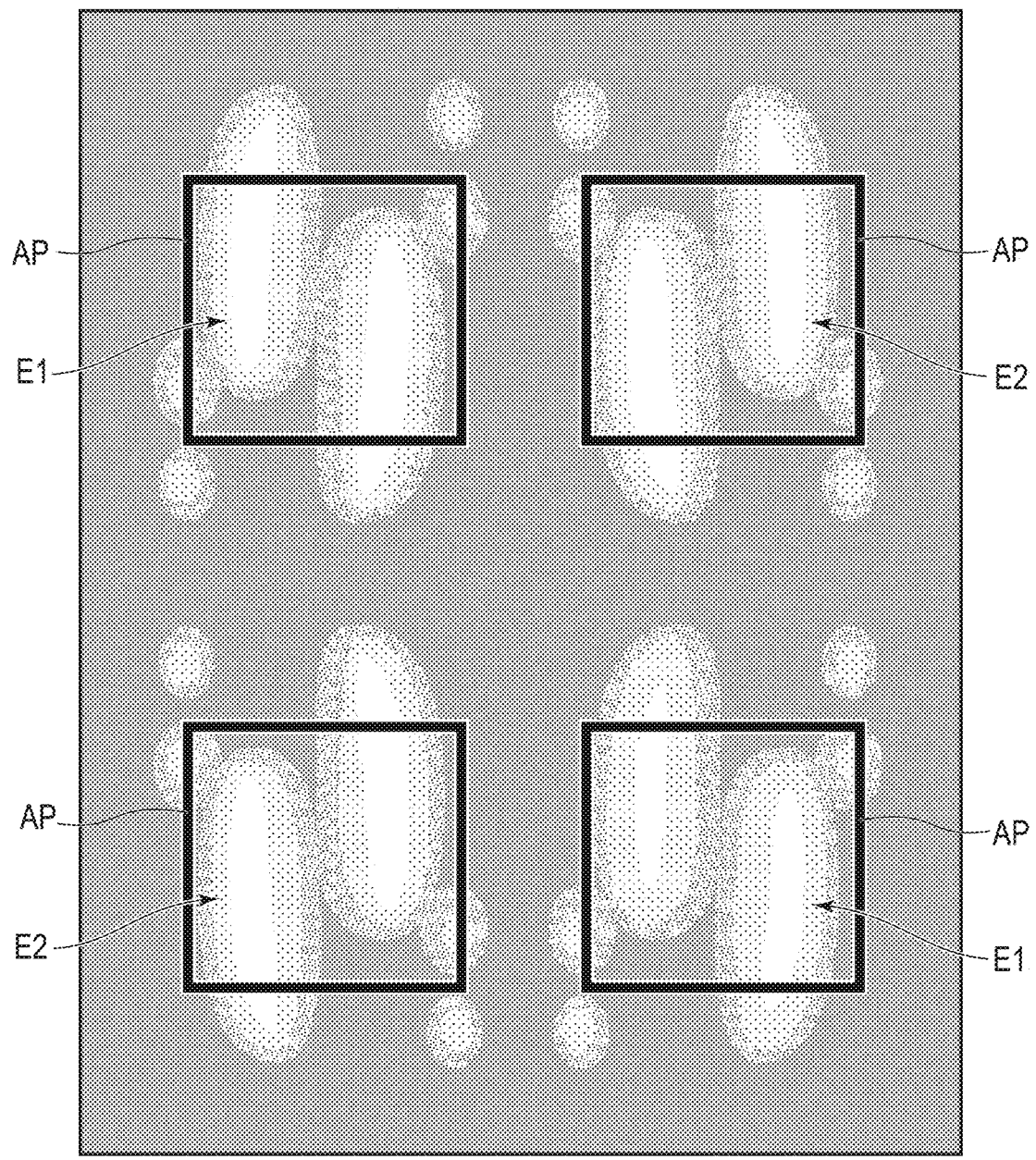
FIG. 15 is a diagram showing results of simulation of the transmittance distribution in the configuration shown in FIG. 14.

FIG. 14 is a schematic plan view showing the pixel electrodes PE, the first common electrode CE1, the second common electrode CE2 and the metal layers ML, which are stacked. FIG. 15 is a diagram showing simulation results of the transmittance distribution when a potential difference of 5 V is created between the pixel electrodes PE and the common electrodes CE in the configuration shown in FIG. 14. In the example illustrated in FIG. 14, the shapes of the second common electrode CE2 and the metal layer ML are the same as those shown in FIG. 4.

The portions P1 of the sub-electrodes SE overlap respectively the pixel electrodes PE (the first pixel electrode and the second pixel electrode) disposed in each of the sub-pixels SP aligned along the X direction. The first edge E1 of the respective portion P1 overlaps the pixel electrode PE (the first pixel electrode), and the second edge E2 overlaps the other pixel electrode PE (the second pixel electrodes). Further, the sixth edge E6 of the portion P1 also overlaps the pixel electrodes PE (the first and second pixel electrodes) disposed in each of the sub-pixels SP aligned along the X direction. Furthermore, the portions P2 of the adjacent pair of sub-electrodes SE also overlaps the pixel electrodes PE (the first and second pixel electrodes) disposed in each of the sub-pixels SP aligned along the X direction. The metal layer ML and the second common electrode CE2 overlap the central part of the respective portion P2 between the respective pixel electrodes PE adjacent to each other along the X direction. With this configuration, the respective shapes of the area where the pixel voltage is applied (the shaded area) and the area where the common voltage is applied (the dotted area) are substantially similar to those of the example in FIG. 6. Therefore, the transmittance distribution shown in FIG. 15 as well is similar to the transmittance distribution in FIG. 7.

From another point of view, the gaps SL between the sub-electrodes SE overlap the pixel electrodes PE, respectively.

With the configuration of this embodiment as well, the transmittance and brightness of the display device 1 can be improved as in the case of each of the above-described embodiments. Note here that in the sub-electrodes SE disclosed, for example, in the first and second embodiments, it may be difficult to obtain a fine shape of the sub-electrodes SE. By contrast, in this embodiment, the portions P2 extending along the X direction realize functions similar to those of the sub-electrodes SE disclosed in the first and second embodiments. Such portions P2 can be formed more precisely as compared to the cases of the sub-electrodes SE disclosed in the first and second embodiments.

Fourth Embodiment

The fourth embodiment will now be described. Note that unless a configuration is not specifically described, configurations similar to those of the already provided embodiments can be applied thereto.

Figure 16:
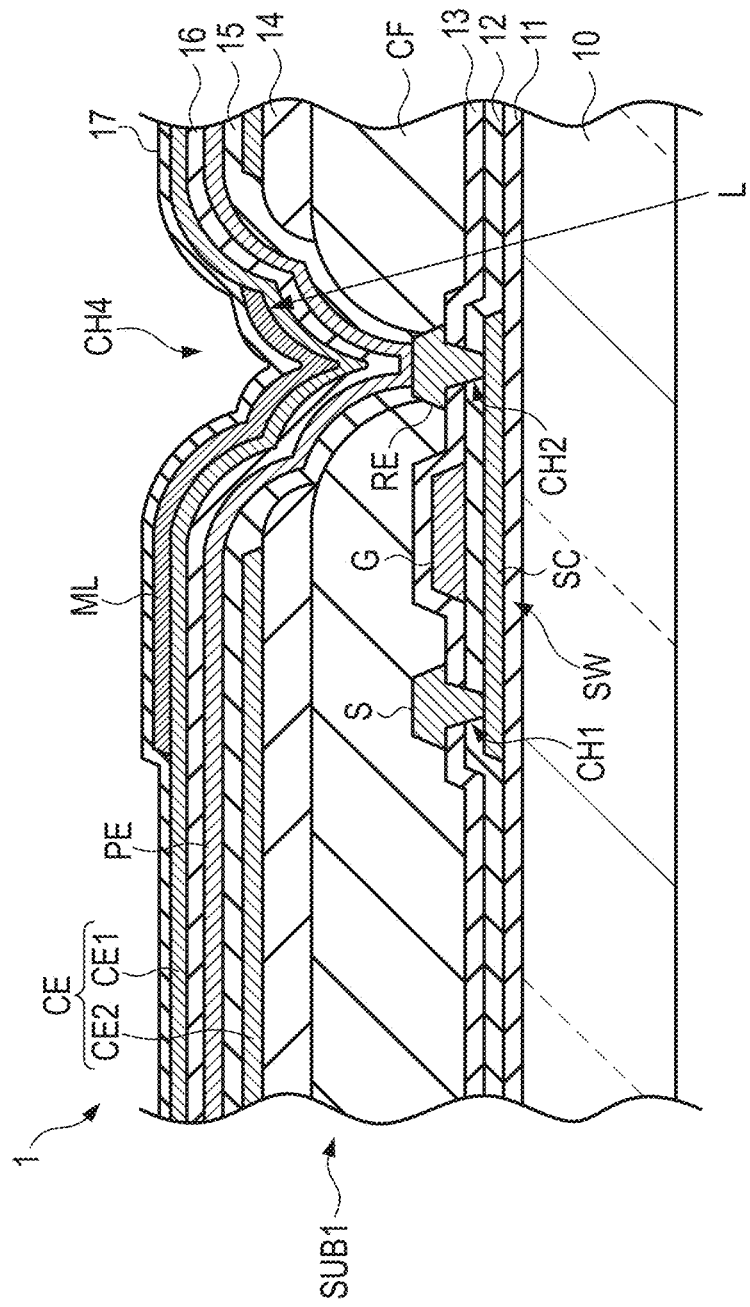
FIG. 16 is a schematic cross-sectional view of a display device according to the fourth embodiment.

FIG. 16 is a schematic cross-sectional view of the first substrate SUB1 of the display device 1 according to this embodiment. In this embodiment, the metal layer ML is disposed between the first common electrode CE1 and the first alignment film 1, and is in contact with the first common electrode CE1. The metal layer ML may be disposed between the first common electrode CE1 and the sixth insulating layer 16. In addition to the metal layer ML in contact with the first common electrode CE1, another metal layer ML in contact with the second common electrode CE2 may be provided.

When the metal layer ML overlaps the fourth contact hole CH4 as shown in FIG. 16, light L incident on the fourth contact hole CH4 can be shielded. With this configuration, the adverse effect on the display quality, caused by unstable alignment of liquid crystal molecules in the vicinity of the fourth contact hole CH4, can be relaxed. In particular, when the color filter layers CF are provided on the first substrate SUB1, the size of the fourth contact hole CH4 becomes larger, and therefore the effect becomes more pronounced.

Figure 17:
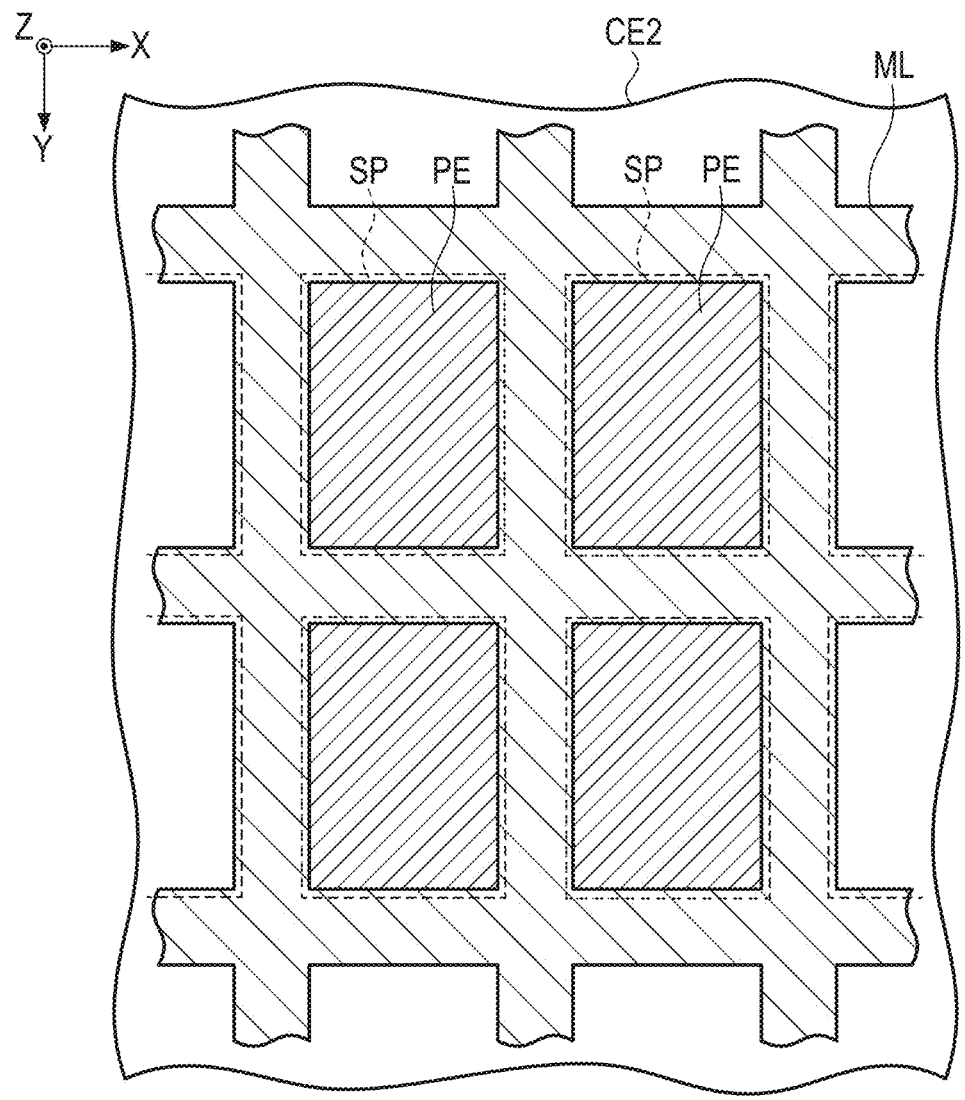
FIG. 17 is a schematic plan view of pixel electrodes, a second common electrode and a metal layer in the fourth embodiment.

FIG. 17 shows a schematic plan view of the pixel electrodes PE, the second common electrodes CE2 and the metal layer ML in this embodiment. Here, the metal layer ML is indicated by downward slanting lines and the pixel electrodes PE are indicated by upward slanting lines. The metal layer ML has a grating pattern passing between adjacent sub-pixels SP, as in the example in FIG. 4. The shape of the second common electrode CE2 is similar to that of the example in FIG. 4, for example. Note that the second common electrode CE2 may not necessarily be provided in this embodiment.

Figure 18:
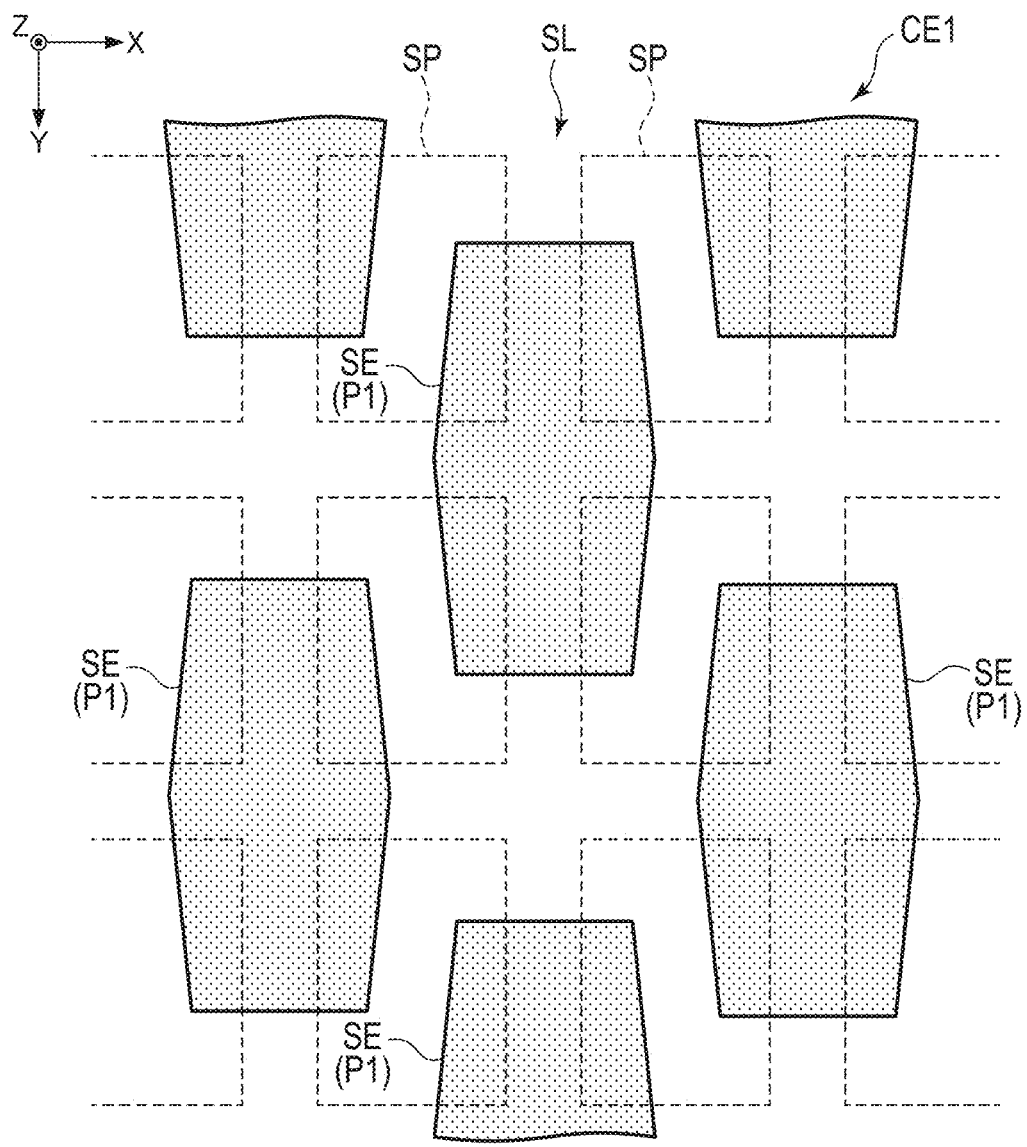
FIG. 18 is a schematic plan view of a first common electrode in the fourth embodiment.

FIG. 18 is a schematic plan view of the first common electrode CE1 in this embodiment. In FIG. 18, the first common electrode CE1 includes portions P1 overlapping the respective sub-pixels SP formed into an island shape. In this embodiment, the portions P2 extending along the X direction that connects the portions P1 are not provided unlike the third embodiment. Note that the configuration of the portions P1 is similar to that of the third embodiment.

That is, the first common electrode CE1 has a mesh-like gap SL. From another point of view, the first common electrode CE1 has a plurality of island-shaped sub-electrodes SE that are independent of each other.

Figure 19:
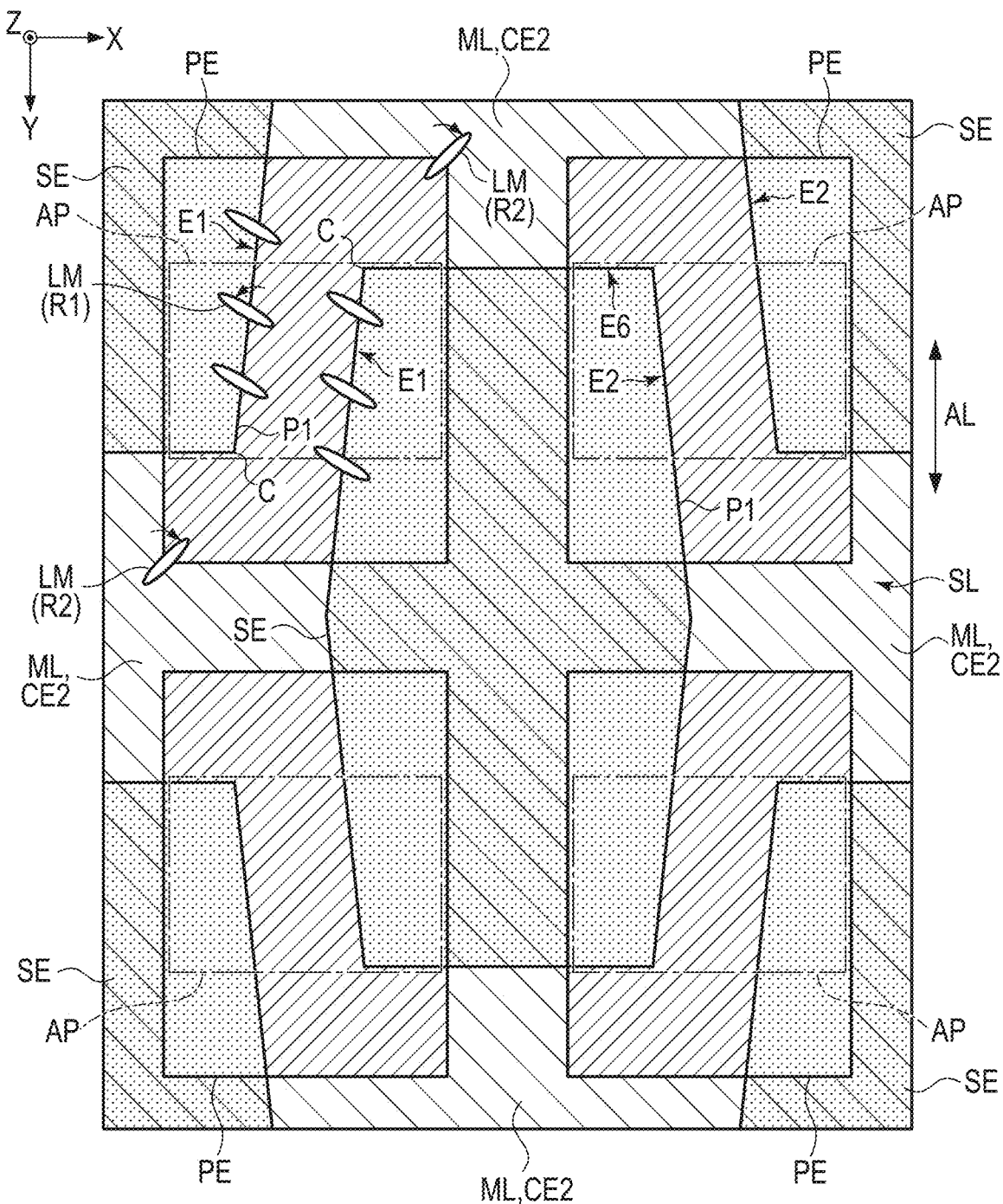
FIG. 19 is a schematic plan view of pixel electrodes, the first common electrode, a second common electrode and a metal layer in the fourth embodiment, which are place to overlap each other.

FIG. 19 is a schematic plan view showing the pixel electrodes PE, the first common electrode CE1, the second common electrode CE2 and the metal layers ML, which are stacked. FIG. 20 is a diagram showing simulation results of the transmittance distribution when a potential difference of 5 V is created between the pixel electrodes PE and the common electrodes CE in the configuration shown in FIG. 19.

The sub-electrodes SE are electrically connected to each other by the metal layers ML. The first and second sides E1 and E2 of each sub-electrode SE overlap the pixel electrodes PE placed in each of the sub-pixels SP aligned along the X direction. Further, the gaps SL each between the respective sub-electrodes SE also partially overlaps the respective pixel electrodes PE. With this configuration, the shape of the area to which the pixel voltage is applied (the area shaded by slash lines) is similar to that of the example in FIG. 14.

Further, the area between the pixel electrodes PE overlaps the metal layer ML, to which the common voltage is applied, and the second common electrode CE2 therebelow. With this configuration, the shape of the area to which the common voltage is applied (the dotted area and the area indicated by downward slanting lines) as well is similar to that of the example in FIG. 14. The transmittance distribution shown in FIG. 20 is also similar to the transmittance distribution in FIG. 15.

With the configuration of this embodiment, the transmittance and brightness of the display device 1 can be enhanced as in each of the above-mentioned embodiments. In this embodiment, the areas where the pixel voltage is applied are created by the combination of the island-shaped sub-electrodes SE and the metal layers ML. In this manner, the areas where the pixel voltage is applied can be formed more precisely without depending on the limitation of L/S in manufacturing technology for the individual elements.

Here, the effects by the configurations in the first to fourth embodiments will now be explained.

FIG. 21 is a table for comparing in the transmittance between the comparative example and the embodiments described above. The transmittances of the comparative example and the embodiments are average values of the transmittance distributions in the apertures AP in FIGS. 9, 7, 12, 15 and 20, respectively. These values are relative to the value of the comparative example, when it is set to 1.00.

As can be seen from this table, the transmittance rate of each of the first to fourth embodiments exceeded that of the comparative example. These results show that the display quality of the display device can be improved by adopting the configurations of the first to fourth embodiments.

Note that in each embodiment, the case where the common electrode CE includes the first common electrode CE1 and the second common electrode CE2 is illustrated as an example. Note, however, that the common electrode CE may not necessary include the second common electrode CE2.

Moreover, in each embodiment, the case where the liquid crystal layer LC contains liquid crystal molecules having positive dielectric constant anisotropy is illustrated. But, the liquid crystal layer LC may as well include liquid crystal molecules with negative (−) dielectric constant anisotropy. In this case, it suffices if the initial alignment direction AL is set parallel to the X direction.

Based on the display devices which have been described in the above-described embodiments, a person having ordinary skill in the art may achieve a display device with an arbitral design change; however, as long as they fall within the scope and spirit of the present invention, such a display device is encompassed by the scope of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

What is claimed is:

1. A liquid crystal display device comprising:
a first substrate;
a second substrate opposing the first substrate; and
a liquid crystal layer between the first substrate and the second substrate, wherein
the first substrate comprises a scanning line extending in a first direction, a signal line extending in a second direction intersecting the first direction, a plurality of pixel electrodes including a first pixel electrode and a second pixel electrode, a common electrode including a first common electrode disposed between the plurality of pixel electrodes and the liquid crystal layer and a second common electrode disposed below the plurality of pixel electrodes, and a metal layer having a same potential as that of the common electrode,
the first common electrode includes a plurality of sub-electrodes that are separated from each other,
the metal layer is disposed on the plurality of sub-electrodes and connects the plurality of sub-electrodes to each other,
gaps are provided respectively between the plurality of sub-electrodes,
the gaps overlap the plurality of pixel electrodes, respectively, and
the metal layer overlaps an area between the first pixel electrode and the second pixel electrode in plan view.

2. The liquid crystal display device of claim 1, wherein each of the plurality of sub-electrodes has a width greater than that of the scanning line or the signal line.

3. The liquid crystal display device of claim 1, wherein each of the plurality of sub-electrodes includes a first edge and a second edge that extend in different directions from each other, and
the first edge and the second edge are inclined at an acute angle with respect to the second direction.

4. The liquid crystal display device of claim 1, wherein each of the plurality of pixel electrodes overlaps at least two of the plurality of sub-electrodes.

5. The liquid crystal display device of claim 1, wherein the second common electrode overlaps the gaps in plan view.

6. The liquid crystal display device of claim 1, wherein the first common electrode and the second common electrode are connected to each other via a contact hole provided in an insulating layer between the first common electrode and the second common electrode.

7. The liquid crystal display device of claim 6, wherein the contact hole is provided at a location of the respective sub-electrode, where the width is largest.

8. The liquid crystal display device of claim 1, wherein the plurality of sub-electrodes are arranged in a staggered pattern.

9. The liquid crystal display device of claim 1, wherein the metal layer overlaps the scanning line and the signal line in plan view.

\* \* \* \* \*